(12) United States Patent
Kim et al.

(10) Patent No.: US 9,690,404 B2
(45) Date of Patent: Jun. 27, 2017

(54) METHOD AND ELECTRONIC DEVICE FOR TRANSMITTING CONTENT

(71) Applicant: Samsung Electronics Co. Ltd., Suwon-si, Gyeonggi-do (KR)

(72) Inventors: Min-Ji Kim, Seoul (KR); Jin Park, Yongin-si (KR); Yong-Soo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 13/858,352

(22) Filed: Apr. 8, 2013

(65) Prior Publication Data

US 2013/0271406 A1    Oct. 17, 2013

(30) Foreign Application Priority Data

Apr. 17, 2012   (KR) .................. 10-2012-0039636

(51) Int. Cl.
| | | |
|---|---|---|
| *G06F 3/041* | (2006.01) | |
| *G06F 3/0354* | (2013.01) | |
| *G06F 3/038* | (2013.01) | |
| *G06F 3/0488* | (2013.01) | |

(52) U.S. Cl.
CPC .......... *G06F 3/0412* (2013.01); *G06F 3/0383* (2013.01); *G06F 3/03545* (2013.01); *G06F 3/0488* (2013.01)

(58) Field of Classification Search
CPC ............... G06F 3/0488; G06F 3/04883; G06F 3/04886; G06F 3/045
See application file for complete search history.

(56) References Cited

U.S. PATENT DOCUMENTS

| | | | | |
|---|---|---|---|---|
| 2002/0026500 | A1* | 2/2002 | Kanefsky et al. ............ | 709/219 |
| 2005/0004986 | A1* | 1/2005 | Aoki et al. ................... | 709/206 |
| 2006/0250374 | A1* | 11/2006 | Morita ......................... | 345/173 |
| 2011/0163944 | A1 | 7/2011 | Bilbrey et al. | |

FOREIGN PATENT DOCUMENTS

| | | |
|---|---|---|
| KR | 1999-0069960 A | 9/1999 |
| KR | 10-2011-0016340 A | 2/2011 |

* cited by examiner

*Primary Examiner* — Ilana Spar
*Assistant Examiner* — Mihir K Rayan
(74) *Attorney, Agent, or Firm* — Jefferson IP Law, LLP

(57) ABSTRACT

A method for transmitting content and an electronic device thereof are provided. In a method for transmitting content in an electronic device, a first electronic device transmits content information to an electronic pen. The electronic pen transmits the content information to a second electronic device.

12 Claims, 16 Drawing Sheets

METHOD AND ELECTRONIC DEVICE FOR TRANSMITTING CONTENT

PRIORITY

This application claims the benefit under 35 U.S.C. §119 (a) of a Korean patent application filed on Apr. 17, 2012 in the Korean Intellectual Property Office and assigned Serial No. 10-2012-0039636, the entire disclosure of which is hereby incorporated by reference.

BACKGROUND OF THE INVENTION

1. Field of the Invention

The present invention relates to a method and an electronic device for transmitting content. More particularly, the present invention relates to a method and an electronic device for transmitting content of the electronic device using an electronic pen.

2. Description of the Related Art

A portable electronic device has become a necessity of modern people due to convenience of portability. The portable electronic device has evolved into a multimedia apparatus providing various services such as voice and video communication, an information input/output function, data storage, and the like.

Also, the portable electronic device provides various methods that can share data such as a photo, a moving picture, a document, and music between portable electronic devices. However, to share data between portable electronic devices, a plurality of operations for connecting the portable electronic devices are required. For example, in the case in which a first portable electronic device transmits moving picture data to a second portable electronic device, the first portable electronic device and the second portable electronic device are connected via a communication link. At this point, the communication link includes a wireless Local Area Network (LAN) direct, infrared communication, Near Field Communication (NFC), and Bluetooth.

In case of connecting a communication link using Bluetooth, a first electronic device retrieves peripheral electronic devices to which the Bluetooth communication link may be connected. Thereafter, the first electronic device connects a communication link with a second electronic device via paring with the second electronic device selected by a user among the peripheral electronic devices. The first electronic device and the second electronic device share data via the connected communication link.

As described above, when data is being shared between portable electronic devices, a user of the first electronic device should establish a communication link connection with the second electronic device according to a communication link set scheme defined by a communication scheme. Accordingly, an improved interface for sharing data in a portable electronic device is required.

Therefore, a need exists for an apparatus and method for transmitting content in an electronic device, and an apparatus and method for transmitting content between electronic devices.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and a device for transmitting content in an electronic device.

In accordance with another aspect of the present invention a method and a device for transmitting content between electronic devices are provided.

In accordance with another aspect of the present invention a method and a device for transmitting content in an electronic device using an electronic pen are provided.

In accordance with another aspect of the present invention a method and a device for transmitting a content URL of an electronic device using an electronic pen are provided.

In accordance with another aspect of the present invention a method and a device for receiving content of an electronic device using a content URL are provided.

In accordance with an aspect of the present invention, a method for transmitting content information in an electronic device is provided. The method includes connecting a communication link with a first electronic device, transmitting content information to be transmitted to a second electronic device to the first electronic device, and releasing the communication link with the first electronic device.

In accordance with another aspect of the present invention, a method for transmitting content information in an electronic device is provided. The method includes connecting a first communication link with a first electronic device, receiving content information from the first electronic device, connecting a second communication link with a second electronic device, and transmitting the content information received from the first electronic device to the second electronic device.

In accordance with another aspect of the present invention, a method for receiving content information in an electronic device is provided. The method includes connecting a communication link with a first electronic device, and receiving content information of a second electronic device from the first electronic device.

In accordance with another aspect of the present invention, an electronic device is provided. The electronic device includes at least one processor, a memory, and at least one program stored in the memory and configured for being executable by the at least one processor, wherein the at least one program includes at least one instruction for connecting a communication link with a first electronic device and for transmitting to the first electronic device content information to be transmitted to a second electronic device.

In accordance with another aspect of the present invention, an electronic device is provided. The electronic device includes at least one processor, a memory, and at least one program stored in the memory and configured for being executable by the at least one processor, wherein the at least one program includes at least one instruction for connecting a first communication link with a first electronic device, for receiving content information from the first electronic device, for connecting a second communication link with a second electronic device, and for transmitting to the second electronic device the content information received from the first electronic device.

In accordance with another aspect of the present invention, an electronic device is provided. The electronic device includes at least one processor, a memory, and at least one program stored in the memory and configured for being executable by the at least one processor, wherein the at least one program includes at least one instruction for connecting a first communication link with a first electronic device, and for receiving content information of a second electronic device from the first electronic device.

In accordance with another aspect of the present invention, a communication system for transmitting content information is provided. The system includes a first electronic device for connecting a communication link with a second electronic device, and for transmitting to the second electronic device content information to be transmitted to a third electronic device, the second electronic device for connecting a communication link with the third electronic device to transmit to the third electronic device content information of the first electronic device received via the communication link with the first electronic device, and the third electronic device for receiving the content information of the first electronic device via the second electronic device.

The communication link may comprise at least one of a Mobile Communication (GSM) network, an Enhanced Data GSM Environment (EDGE) network, a Code Division Multiple Access (CDMA) network, a Wide-CDMA (W-CDMA) network, a Long Term Evolution (LTE) network, an Orthogonal Frequency Division Multiple Access (OFDMA) network, a wireless Local Area Network (LAN), a Bluetooth network, and Near Field Communication (NFC).

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a technology for transmitting content in an electronic device.

In the following description, the electronic device includes a Personal Digital Assistant (PDA), a laptop computer, a smart phone, a netbook, a Mobile Internet Device (MID), an Ultra Mobile PC (UMPC), a tablet Personal Computer (PC), a smart TV, a navigation, an MP3, etc.

Figure 1:
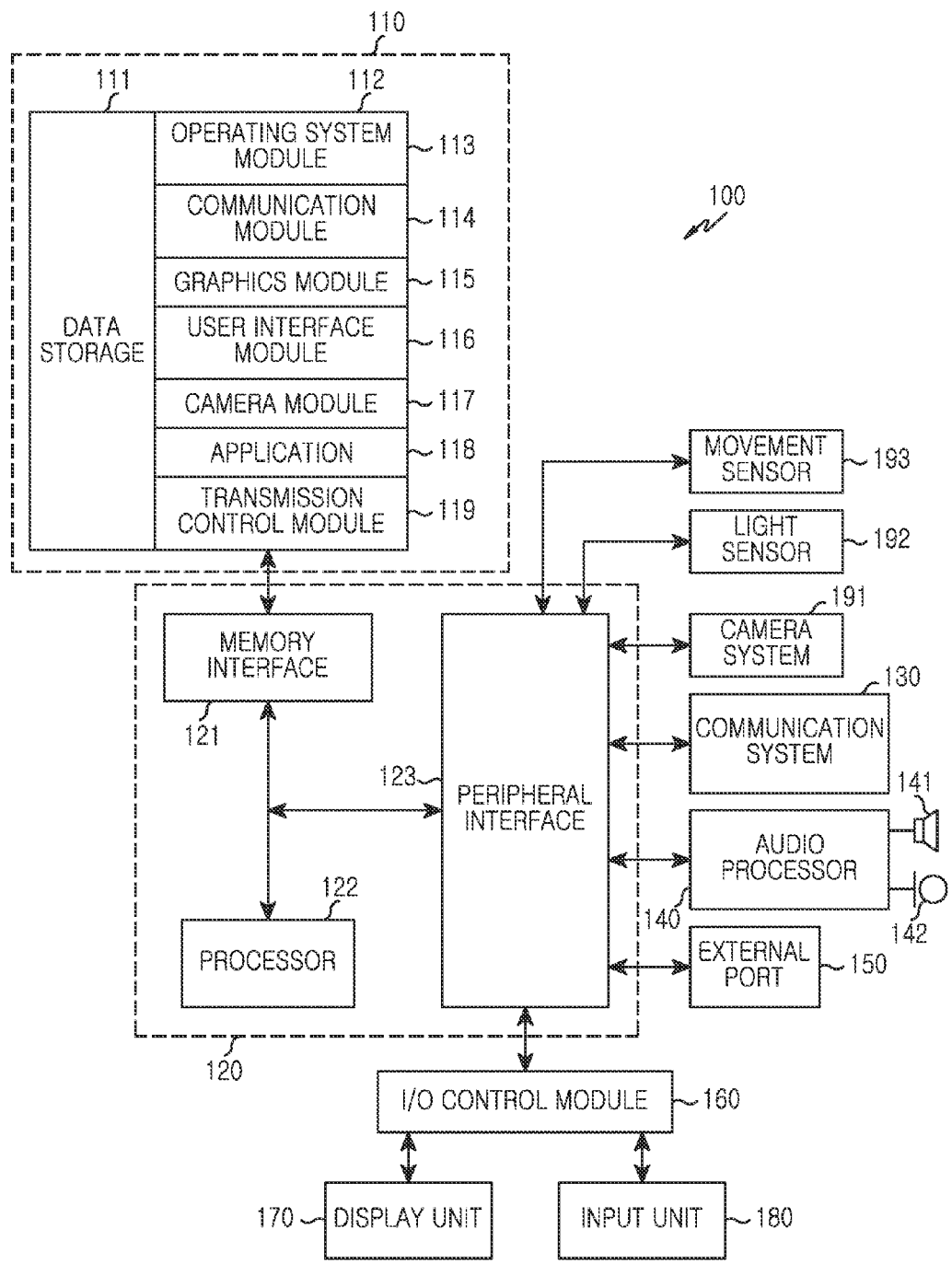
FIG. 1 is a block diagram illustrating an electronic device according to an exemplary embodiment of the present invention.

FIG. 1 is a block diagram illustrating an electronic device according to an exemplary embodiment of the present invention.

Referring to FIG. 1, the electronic device 100 includes a memory 110, a processor unit 120, a communication system 130, an audio processor 140, an external port 150, an Input/Output (I/O) control module 160, a display unit 170, an input unit 180, a camera system 191, a light sensor 192, and a movement sensor 193. According to exemplary embodiments of the present invention, a plurality of memories 110, communication systems 130, and external ports 150 may be provided.

The memory 110 may include a program storage 112 for storing a program for controlling an operation of the electronic device 100 and a data storage 111 for storing data occurring during execution of the program. For example, the program storage 112 includes an operating system module 113, a communication module 114, a graphics module 115, a user interface module 116, a camera module 117, at least one application module 118, and a transmission control module 119. Because the module included in the program storage 112 is a set of instructions, the module can be expressed as an instruction set or a program.

The operating system module 113 includes at least one software element for controlling a general system operation. Also, the operation system module 113 performs a function for smoothing communication between a plurality of hardware and software elements.

The communication module 114 includes at least one software element for processing data transmitted/received via the communication system 130 or the external port 150.

The graphics module 115 includes at least one software element for providing and for displaying graphics on the display unit 170.

The user interface module 116 includes at least one software element related to a user interface.

The camera module 117 includes a camera related software element for enabling camera-related processes and functions.

The application module 118 includes a software element for at least one application program installed in the electronic device 100.

The transmission control module 119 controls the electronic device 100 to transmit content. For example, when connecting a communication link with an electronic pen via the communication system 130 or the external port 150, the transmission control module 119 determines an input of the electronic pen via the display unit 170 formed with a touchscreen. Thereafter, the transmission control module 119 transmits content to the electronic pen depending on an input of the electronic pen. The transmission control module 119 may transmit a content URL to the electronic pen depending on the input of the electronic pen.

The processor module 120 includes a memory interface 121, at least one processor 122, and a peripheral interface 123. The memory interface 121, the at least one processor 122, and the peripheral interface 123 may be integrated into one integrated circuit or realized as separate elements.

The memory interface 121 controls a memory access of an element such as the processor 122 and the peripheral interface 123.

The peripheral interface 123 controls connection between the I/O peripheral units, the processor 122, and the memory interface 121 of the electronic device 100.

The processor 122 controls the electronic device 100 to provide various services such as voice communication and data communication using at least one software program. Also, the processor 122 executes at least one software module stored in the memory 110 to control to provide a service corresponding to the relevant software module. For example, the processor 122 may include at least one data processor, an image processor, and an output control processor.

The communication system 130 performs a communication function with an electronic pen with respect to a communication link connected via the transmission control module 119. The communication system 130 may be divided into a plurality of communication submodules that support a plurality of different communication networks. For example, the communication network includes a Global System for Mobile Communication (GSM) network, an Enhanced Data GSM Environment (EDGE) network, a Code Division Multiple Access (CDMA) network, a Wide-CDMA (W-CDMA) network, a Long Term Evolution (LTE) network, an Orthogonal Frequency Division Multiple Access (OFDMA) network, a wireless Local Area Network (LAN), a Bluetooth network, Near Field Communication (NFC), and the like. The wireless LAN may include tethering and a wireless LAN direct method.

The audio processor 140 may be coupled to a speaker 141 and a microphone 142 to take charge of voice recognition, voice duplication, digital recording, and input/output of an audio stream such a telephone function.

The external port 150 includes a connection interface for directly connecting the electronic device 100 to an external electronic device, or connecting the electronic device 100 to a different electronic device via a network. For example, the external port 150 includes a Universal Serial Bus (USB) port, a High-Definition Multimedia Interface (HDMI) port, a Firewire port, and the like.

The I/O control module 160 provides an interface between the I/O unit such as the display unit 170 and the input unit 180 and the peripheral interface 123.

The display unit 170 displays status information of the electronic device 100, a character input by a user, a moving picture, a still picture, and the like under control of the graphics module 115. According to exemplary embodiments of the present invention, if the display unit 170 is configured using a touchscreen, the display unit 170 provides touch information of the touchscreen to the processor module 120 via the I/O control module 160.

The input unit 180 provides input data generated by the user's selection to the processor module 120 via the I/O control module 160. For example, the input unit 180 includes only a control button for controlling the electronic device 100. As another example, the input unit 180 may be configured using a keypad for receiving input data from the user.

The camera system 191 may be coupled to the light sensor 192 to perform a function for capturing at least one of moving picture data and still picture data.

The movement sensor 193 and the light sensor 192 may be coupled to the peripheral interface 123 to enable various functions. For example, the movement sensor 193 and the light sensor 192 may be coupled to the peripheral interface 123 to enable detection of movement of the electronic device and detection of light from the outside, respectively. Besides, other sensors such as a position measure system, a temperature sensor, a living body sensor, and the like may be connected to the peripheral interface 123 to perform related functions.

Though not shown, the memory 110 of the electronic device 100 may further include a reception control module for receiving content of a second electronic device via an electronic pen. In case of reception of URL information storing content of the second electronic device via the electronic pen, the reception control module includes an instruction for receiving the content of the second electronic device with consideration of the URL information.

Figure 2:
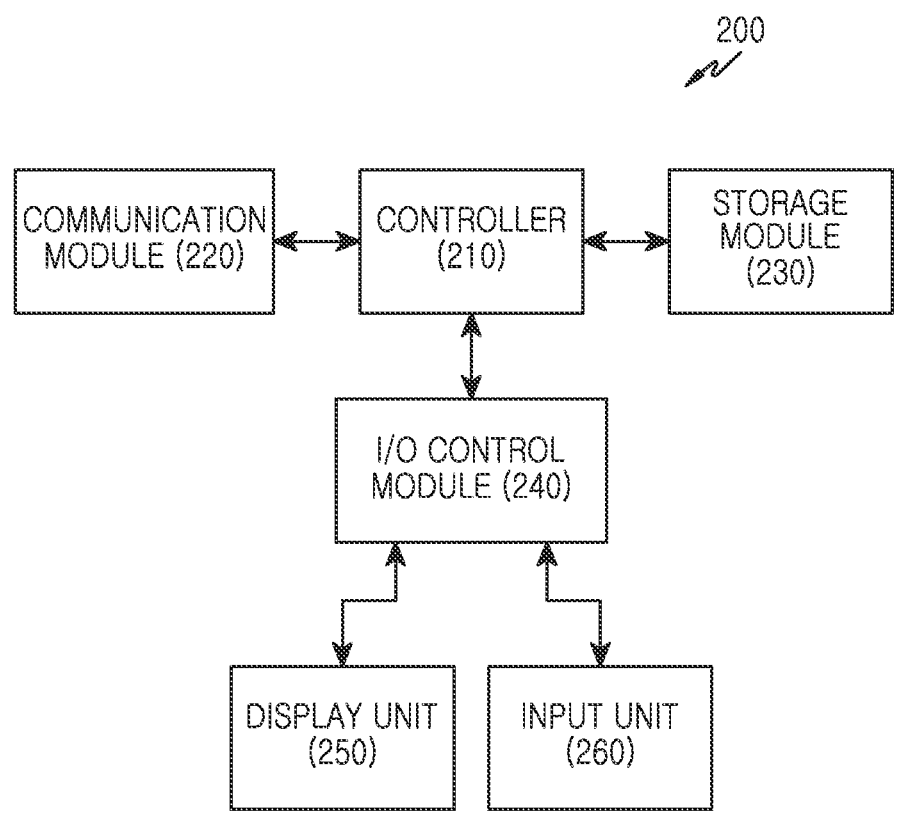
FIG. 2 is a block diagram illustrating an electronic pen according to an exemplary embodiment of the present invention.

FIG. 2 is a block diagram illustrating an electronic pen according to an exemplary embodiment of the present invention.

Referring to FIG. 2, the electronic pen 200 includes a controller 210, a communication module 220, a storage module 230, an I/O control module 240, a display unit 250, and an input unit 260. According to exemplary embodiments of the present invention, a plurality of communication modules 220 may exist.

The controller 210 controls an access of the communication module 220, the storage module 230, and the I/O control module 240. The controller 210 may include at least one processor.

The communication module 220 performs a communication function with the electronic device. The communication module 220 may be divided into a plurality of communication submodules that support different communication networks.

The storage module 230 may include a program storage for storing a program for controlling an operation of the electronic pen 200, and a data storage for storing data occurring during execution of a program. For example, the program storage includes an instruction for setting a communication link with the electronic device 100 to receive content information of the electronic device 100, and for setting a communication link with a second electronic device to transmit the content information of the electronic device 100 to the second electronic device. As another example, the data storage may store at least one of data and a URL of the data received from the electronic device 100.

The I/O control module 240 provides an interface between an I/O unit such as the display unit 250 and the input unit 260 and the controller 210.

The display unit 250 displays status information of the electronic pen 200. For example, the status information includes at least one of a residual size of a storage space of the electronic pen 200, a data list, data information, and the like.

The input unit 260 provides input data generated by a user's selection to the controller 210 via the I/O control module 240. For example, the input unit 260 includes only a control button for controlling the electronic pen 200. As another example, the input unit 260 may be configured using a keypad for receiving input data from the user.

Figure 3:
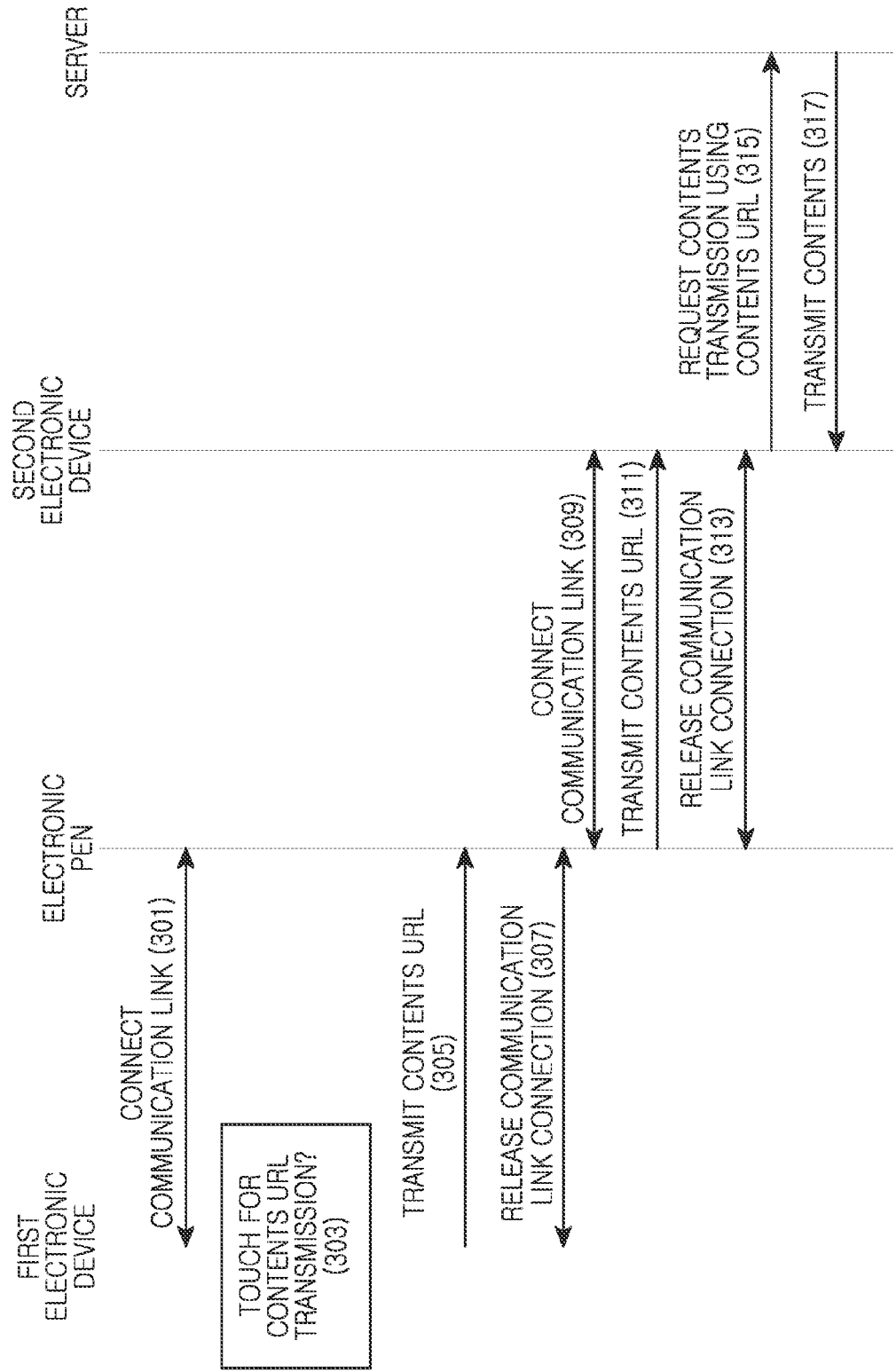
FIG. 3 is a view illustrating a procedure for transmitting content in an electronic device according to an exemplary embodiment of the present invention.

FIG. 3 is a view illustrating a procedure for transmitting content in an electronic device according to an exemplary embodiment of the present invention.

Figure 16C:
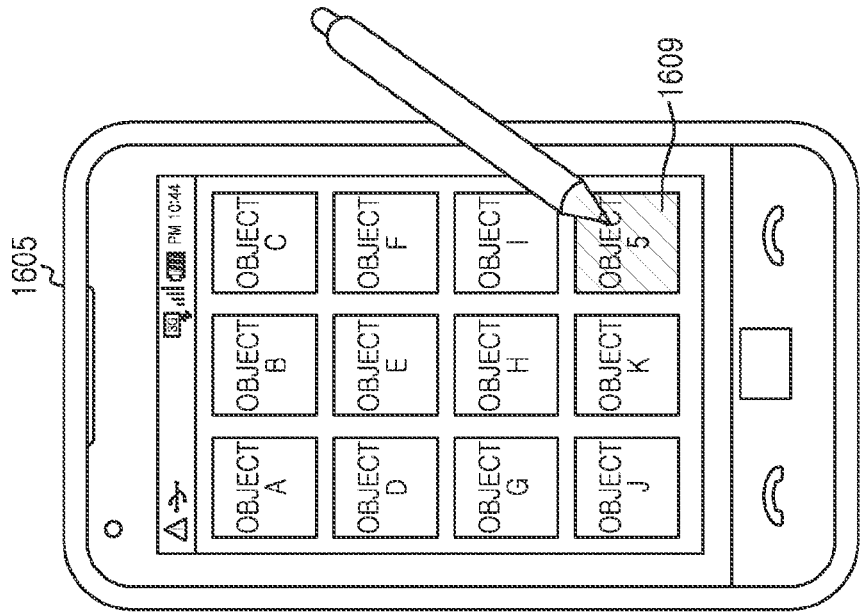
FIGS. 16A to 16C are diagrams illustrating screen configurations for transmitting, at a first electronic device, content to a second electronic device using an electronic pen according to an exemplary embodiment of the present invention.
Figure 16B:
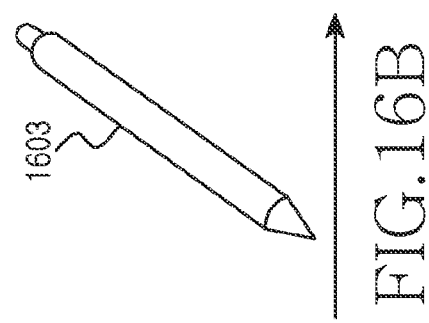
Figure 16A:
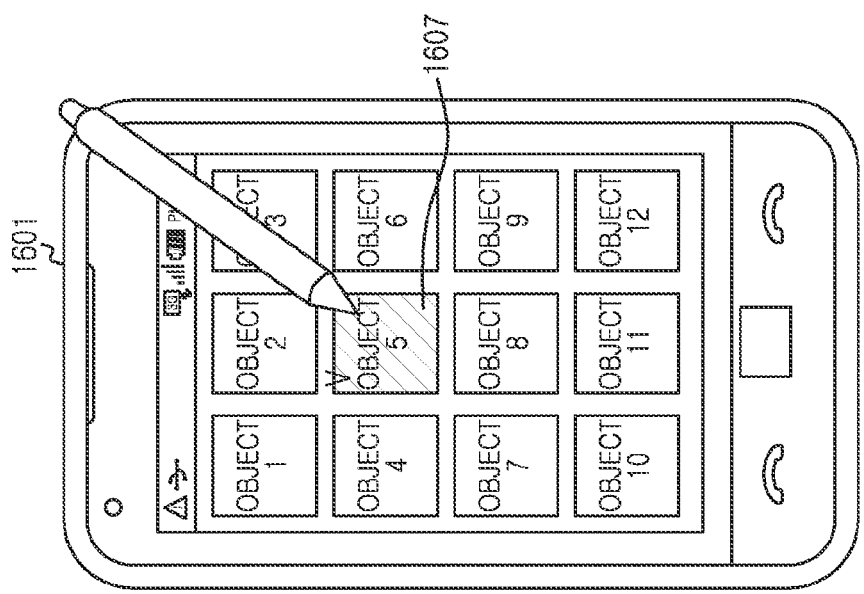

FIGS. 16A to 16C are diagrams illustrating screen configurations for transmitting, at a first electronic device, content to a second electronic device using an electronic pen according to an exemplary embodiment of the present invention.

Referring to FIGS. 3, 16A to 16C, a first electronic device connects a communication link with an electronic pen in step 301. For example, in the case in which the first electronic device and the electronic pen support NFC, the first electronic device detects an NFC signal of the electronic pen within an NFC range and connects the communication link.

The first electronic device determines whether a touch for transmitting a content URL occurs in step 303. For example, the first electronic device determines whether a menu for requesting content URL transmission is selected via a touchscreen. As another example, the first electronic device may determine whether a gesture for requesting content URL transmission is detected. The content URL denotes a store path of data that is being provided by the first electronic device, and includes location information indicating a location at which a photo, a moving picture, a document, an application, and the like are respectively stored.

The first electronic device transmits the content URL to the electronic pen in step 305. For example, as illustrated in FIGS. 16A and 16B, in the case in which a URL transmission request for moving picture data 1607 that are being provided by a first electronic device 1601 occurs, the first electronic device transmits a store path of the moving picture data that are being provided to an electronic pen 1603. The data 1607 of the first electronic device may be stored in a specific server.

The first electronic device releases the communication link connection with the electronic pen in step 307. For example, when the first electronic device and the electronic pen are connected via the NFC, the first electronic device releases the communication link connection between the first electronic device and the electronic pen if an NFC signal of the electronic pen is not detected within the NFC range.

The electronic pen connects a communication link with a second electronic device in step 309. For example, if the electronic pen and the second electronic device support NFC, the electronic pen detects an NFC signal of the second electronic device within the NFC range to connect the communication link.

The electronic pen transmits a content URL to the second electronic device in step 311. For example, as illustrated in FIG. 16C, the electronic pen selects a menu for requesting transmission of a content 1609 URL via a touchscreen of the second electronic device 1605. For another example, the electronic pen may input a gesture for requesting transmission of the content 1609 URL.

The electronic pen releases the communication link connection with the second electronic device in step 313. For example, when the electronic pen and the second electronic device are connected via the NFC, the electronic pen releases the communication link connection between the electronic pen and the second electronic device if an NFC signal of the second electronic device is not detected within the NFC range.

The second electronic device requests a server to transmit the content using the content URL received from the electronic pen in step 315.

The second electronic device receives the content from the server in step 317. The content corresponds to data that is being provided by the first electronic device, and may include a photo, a moving picture, a document, an application, and the like.

Figure 4:
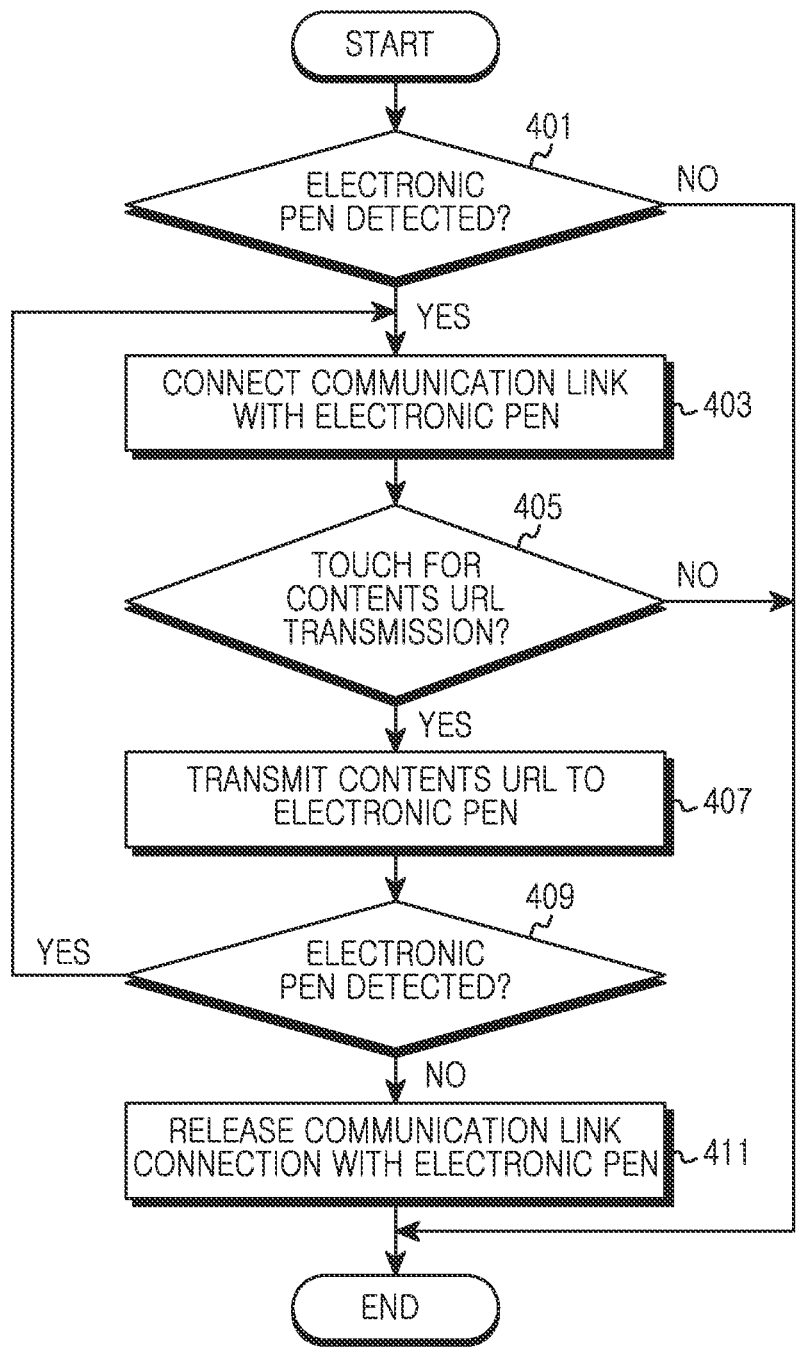
FIG. 4 is a flowchart illustrating a procedure for transmitting, at a first electronic device, a content URL to an electronic pen according to an exemplary embodiment of the present invention.

FIG. 4 is a flowchart illustrating a procedure for transmitting a content URL to an electronic pen according to an exemplary embodiment of the present invention.

Referring to FIG. 4, the first electronic device determines whether the electronic pen is detected in step 401. For example, if the electronic pen supports NFC, the first electronic device determines whether an NFC signal of the electronic pen is detected within NFC range. As another example, if the electronic pen supports wireless LAN direct, the first electronic device may determine whether a wireless LAN direct signal of the electronic pen is detected within a wireless LAN direct range. If the electronic pen is not detected, the first electronic device ends the present algorithm.

In contrast, if the electronic pen is detected in step 401, the first electronic device proceeds to step 403 in which the first electronic device connects a communication link with the electronic pen.

Thereafter, the first electronic device proceeds to step 405 in which the first electronic device determines whether a touch for content URL transmission occurs. For example, as illustrated in FIG. 16A, the first electronic device 1601 determines whether a menu for requesting content 1607 URL transmission is selected via the touchscreen. For another example, the first electronic device 1601 may determine whether a gesture for requesting the content 1607 URL transmission is detected. If the touch for the content 1607 URL transmission does not occur, the first electronic device ends the present algorithm.

In contrast, if the touch for the content 1607 URL transmission occurs in step 405, the first electronic device proceeds to step 407 in which the first electronic device transmits a content URL to the electronic pen. For example, as illustrated in FIGS. 16A and 16B, if a transmission request for a URL of moving picture data 1607 that are being provided by the first electronic device 1601 occurs, the first electronic device 1601 transmits a store path of the moving picture data 1607 that is being provided to the electronic pen 1603. At this point, the data of the first electronic device may be stored in a specific server.

After transmitting the content URL to the electronic pen, the first electronic device proceeds to step 409 in which the first electronic devices determines whether the electronic pen is detected. If the electronic pen is detected, the first electronic device proceeds to step 403 to maintain the communication link with the electronic pen.

In contrast, if the electronic pen is not detected in step 409, the first electronic device proceeds to step 411 in which the first electronic device releases the communication link with the electronic pen.

Thereafter, the first electronic device ends the present algorithm.

According to exemplary embodiments of the present invention, the first electronic device may transmit the content URL to the electronic pen.

According to exemplary embodiments of the present invention, the electronic pen may transmit the content URL from the first electronic device to a second electronic device.

Figure 5:
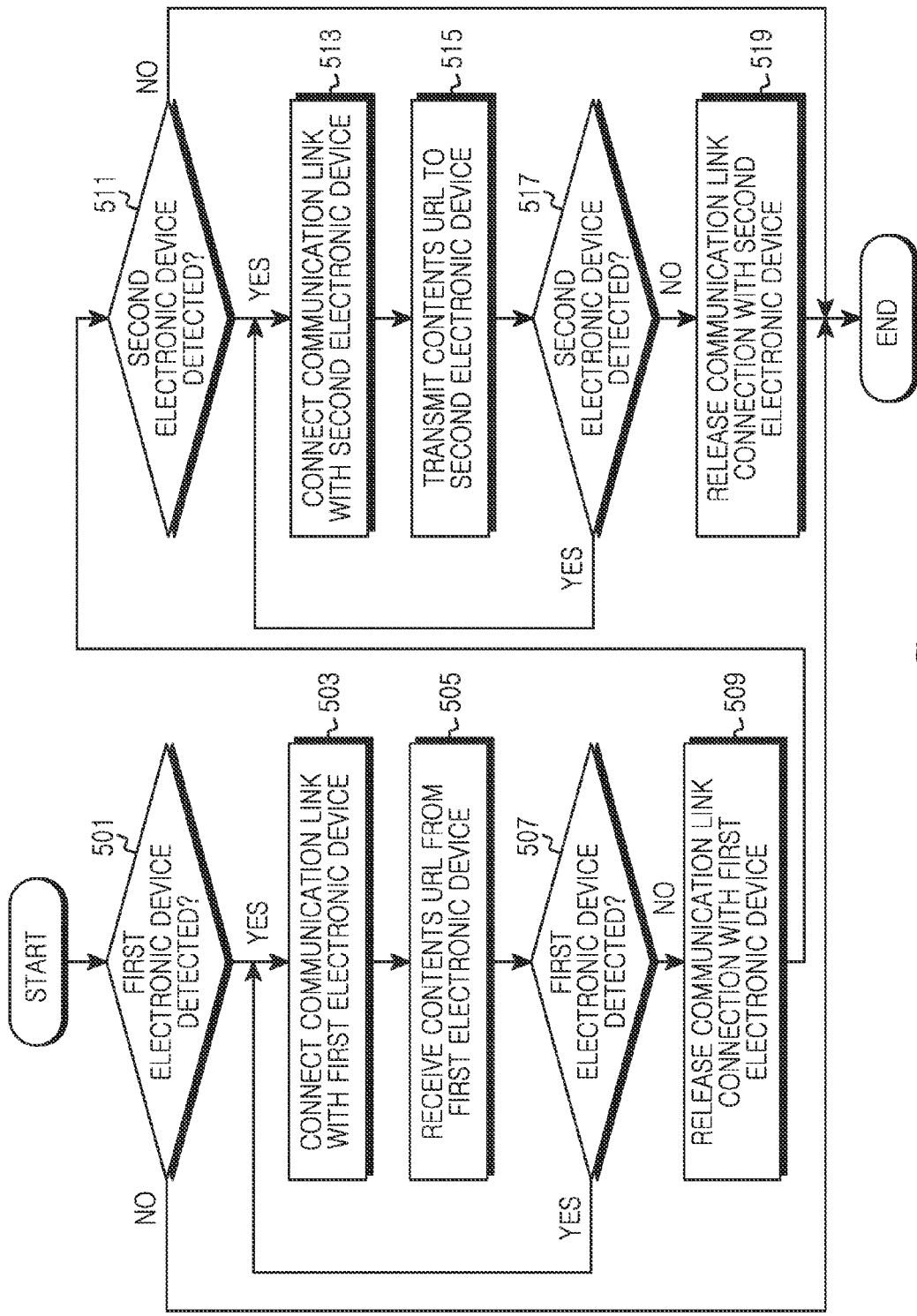
FIG. 5 is a flowchart illustrating a procedure for transmitting a content URL from a first electronic device to a second electronic device using an electronic pen according to an exemplary embodiment of the present invention.

FIG. 5 is a flowchart illustrating a procedure for transmitting a content URL from a first electronic device to a second electronic device using an electronic pen according to an exemplary embodiment of the present invention.

Referring to FIG. 5, the electronic pen determines whether the first electronic device is detected in step 501. For example, if the first electronic device supports NFC, the electronic pen determines whether an NFC signal of the first electronic device is detected within an NFC range. As another example, if the first electronic device supports the wireless LAN direct, the electronic pen may determine whether a wireless LAN direct signal of the first electronic device is detected within a wireless LAN direct range. If the first electronic device is not detected, the electronic pen ends the present algorithm.

In contrast, if the first electronic device is detected in step 501, the electronic pen proceeds to step 503 in which the electronic pen connects a communication link with the first electronic device.

Thereafter, the electronic pen proceeds to step 505 in which the electronic pen receives a content URL from the first electronic device. For example, as illustrated in FIGS. 16A and 16B, the electronic pen 1603 selects a menu for requesting transmission of a content 1607 URL via the touchscreen of the first electronic device 1601. As another example, the electronic pen 1603 may input a gesture for requesting transmission of the content 1607 URL.

After receiving the content URL from the first electronic device, the electronic pen proceeds to step 507 in which the electronic pen determines whether the first electronic device is detected. If the first electronic device is detected, the electronic pen proceeds to step 503 in which the electronic pen maintains the communication link connection with the first electronic device.

In contrast, when the first electronic device is not detected in step 507, the electronic pen proceeds to step 509 in which the electronic pen releases the communication link connection with the first electronic device.

After releasing the communication link connection with the first electronic device, the electronic pen proceeds to step 511 in which the electronic pen determines whether a second electronic device is detected. For example, if the second electronic device supports NFC, the electronic pen determines whether an NFC signal of the second electronic device is detected within an NFC range. As another example, if the second electronic device supports the wireless LAN direct, the electronic pen may determine whether a wireless LAN direct signal of the second electronic device is detected within a wireless LAN direct range. If the second electronic device is not detected, the electronic pen ends the present algorithm.

In contrast, when the second electronic device is detected in step 511, the electronic pen proceeds to step 513 in which the electronic pen connects a communication link with the second electronic device.

Thereafter, the electronic pen proceeds to step 515 in which the electronic pen transmits the content URL to the second electronic device. For example, as illustrated in FIGS. 16B and 16C, the electronic pen 1603 selects a menu for requesting transmission of a content 1609 URL via the touchscreen of the second electronic device 1605. As another example, the electronic pen 1603 may input a gesture for requesting transmission of the content 1609 URL.

After transmitting the content URL to the second electronic device, the electronic pen proceeds to step 517 in which the electronic pen determines whether the second electronic device is detected. If the second electronic device is detected, the electronic pen proceeds to step 513 in which the electronic pen maintains the communication link connection with the second electronic device.

In contrast, if the second electronic device is not detected in step 517, the electronic pen proceeds to step 519 in which the electronic pen releases the communication link connection with the second electronic device.

Thereafter, the electronic pen ends the present algorithm.

According to exemplary embodiments of the present invention, the first electronic device may transmit the content URL to the second electronic device using the electronic pen.

According to exemplary embodiments of the present invention, the second electronic device may receive content stored in a server using the content URL of the first electronic device received from the electronic pen.

Figure 6:
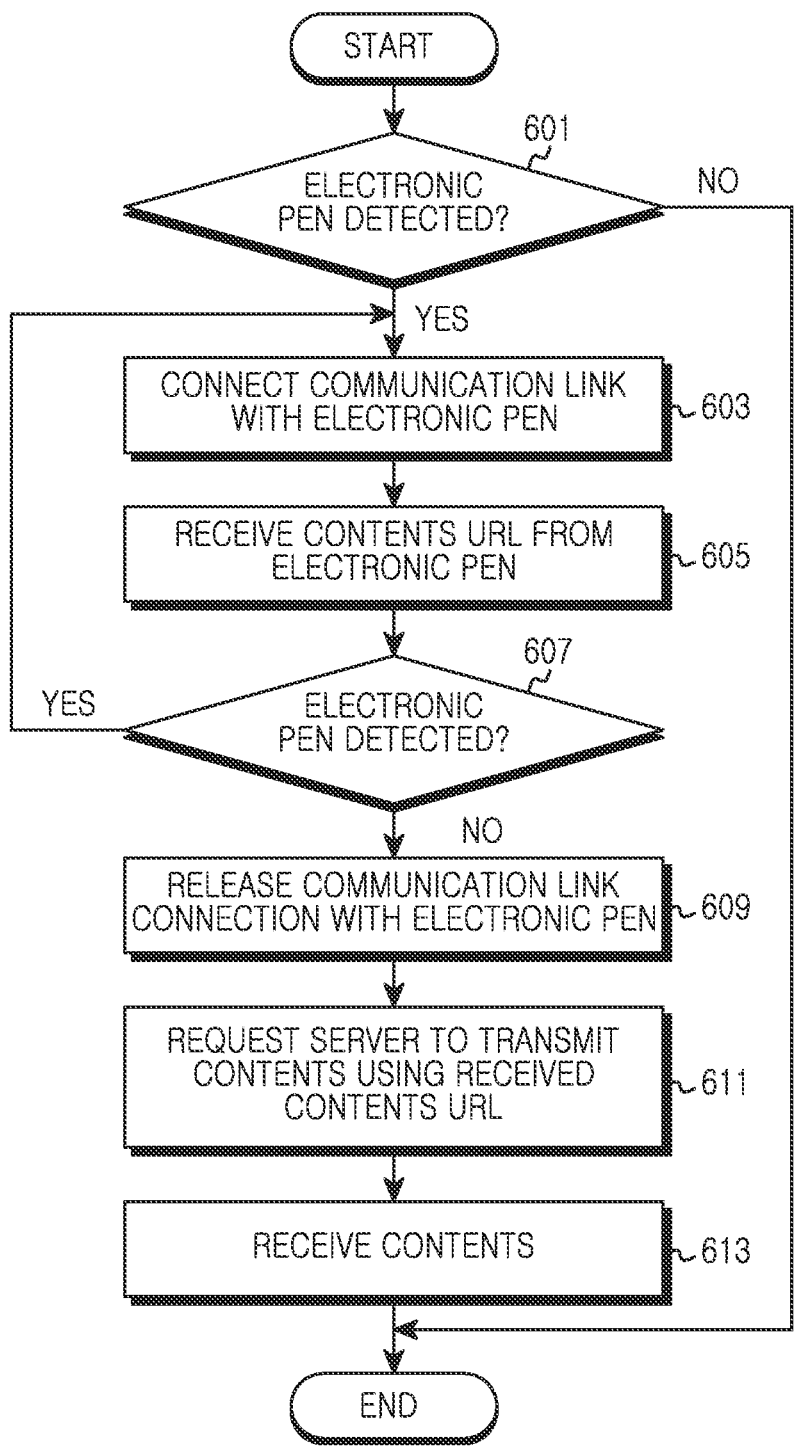
FIG. 6 is a flowchart illustrating a procedure for receiving, at a second electronic device, content stored in a server using a content URL of a first electronic device received from an electronic pen according to an exemplary embodiment of the present invention.

FIG. 6 is a flowchart illustrating a procedure for receiving, at a second electronic device, receiving content stored in a server using a content URL of a first electronic device received from an electronic pen according to an exemplary embodiment of the present invention.

Referring to FIG. 6, the second electronic device determines whether an electronic pen is detected in step 601. For example, if the electronic pen supports NFC, the second electronic device determines whether an NFC signal of the electronic pen is detected within an NFC range. As another example, if the electronic pen supports the wireless LAN direct, the second electronic device may determine whether a wireless LAN direct signal of the electronic pen is detected within a wireless LAN direct range. If the electronic pen is not detected, the second electronic device ends the present algorithm.

In contrast, when the electronic pen is detected in step 601, the second electronic device proceeds to step 603 in which the second electronic device connects a communication link with the electronic pen.

Thereafter, the second electronic device proceeds to step 605 in which the second electronic device receives a content URL from the electronic pen. For example, as illustrated in FIG. 16C, the second electronic device 1605 determines whether a menu for requesting transmission of the content 1609 URL is selected via the touchscreen. As another example, the second electronic device 1605 determines whether a gesture for requesting transmission of the content 1609 URL is detected.

After receiving the content URL from the electronic pen, the second electronic device proceeds to step 607 in which the second electronic device determines whether the electronic pen is detected. If the electronic pen is detected, the second electronic device proceeds to step 603 to maintain a communication link connection with the electronic pen.

In contrast, if the electronic pen is not detected in step 607, the second electronic device proceeds to step 609 in which the second electronic device releases the communication link connection with the electronic pen.

After releasing the communication link connection with the electronic pen, the second electronic device proceeds to step 611 in which the second electronic device requests a server to transmit content using the content URL received from the electronic pen.

After requesting the server to transmit the content using the content URL received from the electronic pen, the second electronic device proceeds to step 613 in which the second electronic device receives the content from the server.

Thereafter, the second electronic device ends the present algorithm.

According to exemplary embodiments of the present invention, the second electronic device may receive the content stored in the server using the content URL of the first electronic device received from the electronic pen.

According to exemplary embodiments of the present invention, the server may transmit the content to the second electronic device.

Figure 7:
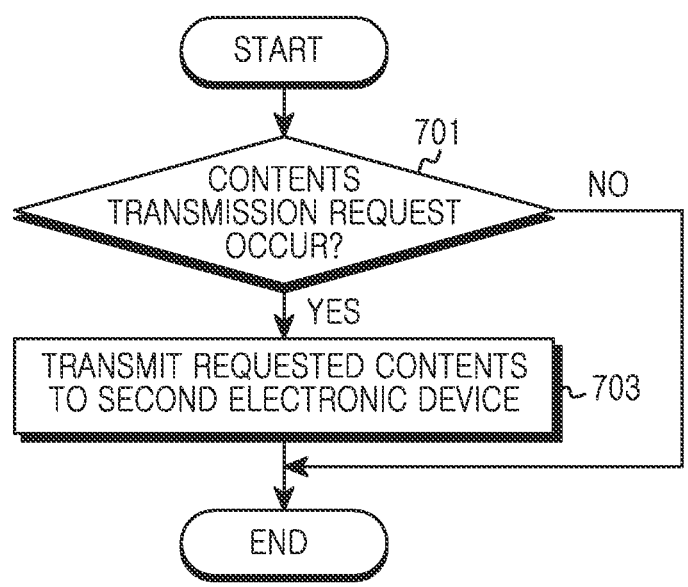
FIG. 7 is a flowchart illustrating a procedure for transmitting, at a server, content to a second electronic device according to an exemplary embodiment of the present invention.

FIG. 7 is a flowchart illustrating a procedure for transmitting, at a server, content to a second electronic device according to an exemplary embodiment of the present invention.

Referring to FIG. 7, the server determines whether a content transmission request is generated from a second electronic device in step 701. If the content transmission request is not generated from the second electronic device, the server ends the present algorithm.

In contrast, if the content transmission request is generated from the second electronic device in step 701, the server proceeds to step 703 in which the server transmits the requested content to the second electronic device.

Thereafter, the server ends the present algorithm.

According to exemplary embodiments of the present invention, the server may transmit a content URL of a first electronic device to the second electronic device using the electronic pen, and the second electronic device may receive the content from the server.

According to exemplary embodiments of the present invention, the server may transmit a content URL of a first electronic device to the second electronic device using the electronic pen, and the second electronic device may receive the content from the first electronic device.

Figure 8:
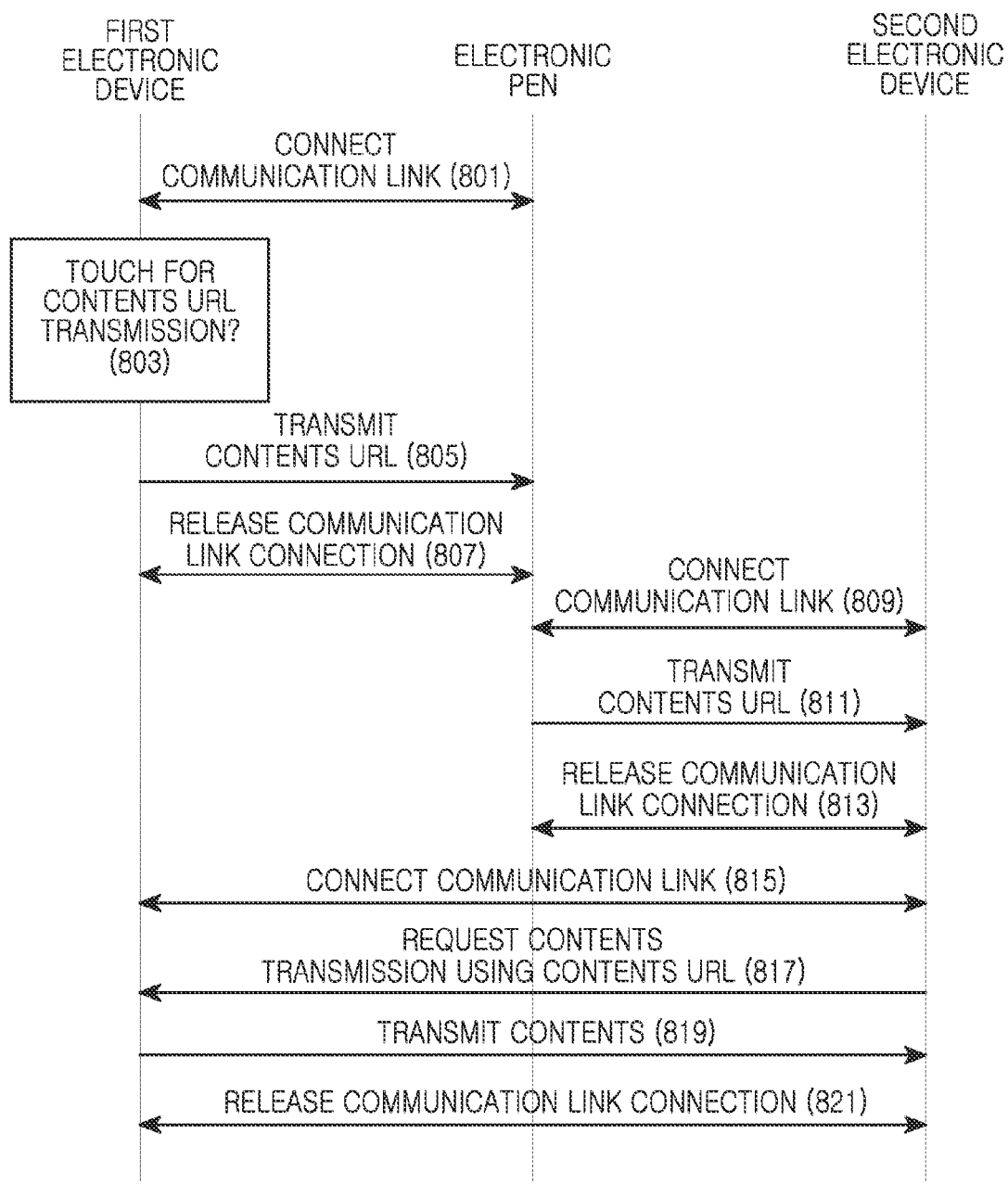
FIG. 8 is a diagram illustrating a procedure for transmitting content at an electronic device according to an exemplary embodiment of the present invention.

FIG. 8 is a diagram illustrating a procedure for transmitting content at an electronic device according to an exemplary embodiment of the present invention.

Referring to FIG. 8, a first electronic device connect a communication link with an electronic pen in step 801. For example, if the first electronic pen and the electronic pen support NFC, the first electronic device detects an NFC signal of the electronic pen within an NFC range to connect a communication link.

The first electronic device determines whether a touch for transmission of a content URL occurs in step 803. For example, as illustrated in FIGS. 16A and 16B, the first electronic device 1601 determines whether a menu for requesting transmission of the content 1607 URL is selected via the touchscreen. As another example, the first electronic device 1601 may determine whether a gesture for requesting transmission of the content 1607 URL is detected.

The first electronic device transmits the content URL to the electronic pen in step 805. As illustrated in FIGS. 16A and 16B, if a URL transmission request for moving picture data 1607 that are being provided by the first electronic device 1601 occurs, the first electronic device 1601 transmits a store path of the moving picture data 1607 that is being provided to the electronic pen 1603.

The first electronic device releases the communication link connection with the electronic pen in step 807. For example, if the first electronic device and the electronic pen are connected via NFC, the first electronic device releases the communication link connection between the first electronic device and the electronic pen if an NFC signal of the electronic pen is not detected within an NFC range.

The electronic pen connects a communication link with a second electronic device in step 809. For example, if the electronic pen and the second electronic device support NFC, the electronic pen detects an NFC signal of the second electronic device within an NFC range to connect the communication link.

The electronic pen transmits a content URL to the second electronic device in step 811. For example, as illustrated in FIGS. 16B and 16C, the electronic pen 1603 selects a menu for requesting transmission of the content 1609 URL via the touchscreen of the second electronic device 1605. As another example, the second electronic device 1605 may input a gesture for requesting transmission of the content 1609 URL.

The electronic pen releases the communication link connection with the second electronic device in step 813. For example, if the electronic pen and the second electronic device are connected via NFC, the electronic pen releases the communication link connection between the electronic pen and the second electronic device if an NFC signal of the second electronic device is not detected within an NFC range.

The first electronic device connects a communication link between the first electronic device and the second electronic device in step 815. For example, if the first electronic device and the second electronic device support NFC, the first electronic device detects an NFC signal of the second electronic device within an NFC range to connect the communication link.

The second electronic device requests the first electronic device to transmit content using the content URL received from the electronic pen in step 817.

The first electronic device transmits the content to the second electronic device in step 819.

The first electronic device releases the communication link connection with the second electronic device in step 821. For example, if the first electronic device and the second electronic device are connected via NFC, the first electronic device releases the communication link connection between the first electronic device and the second electronic device if an NFC signal of the second electronic device is not detected within an NFC range.

Figure 9:
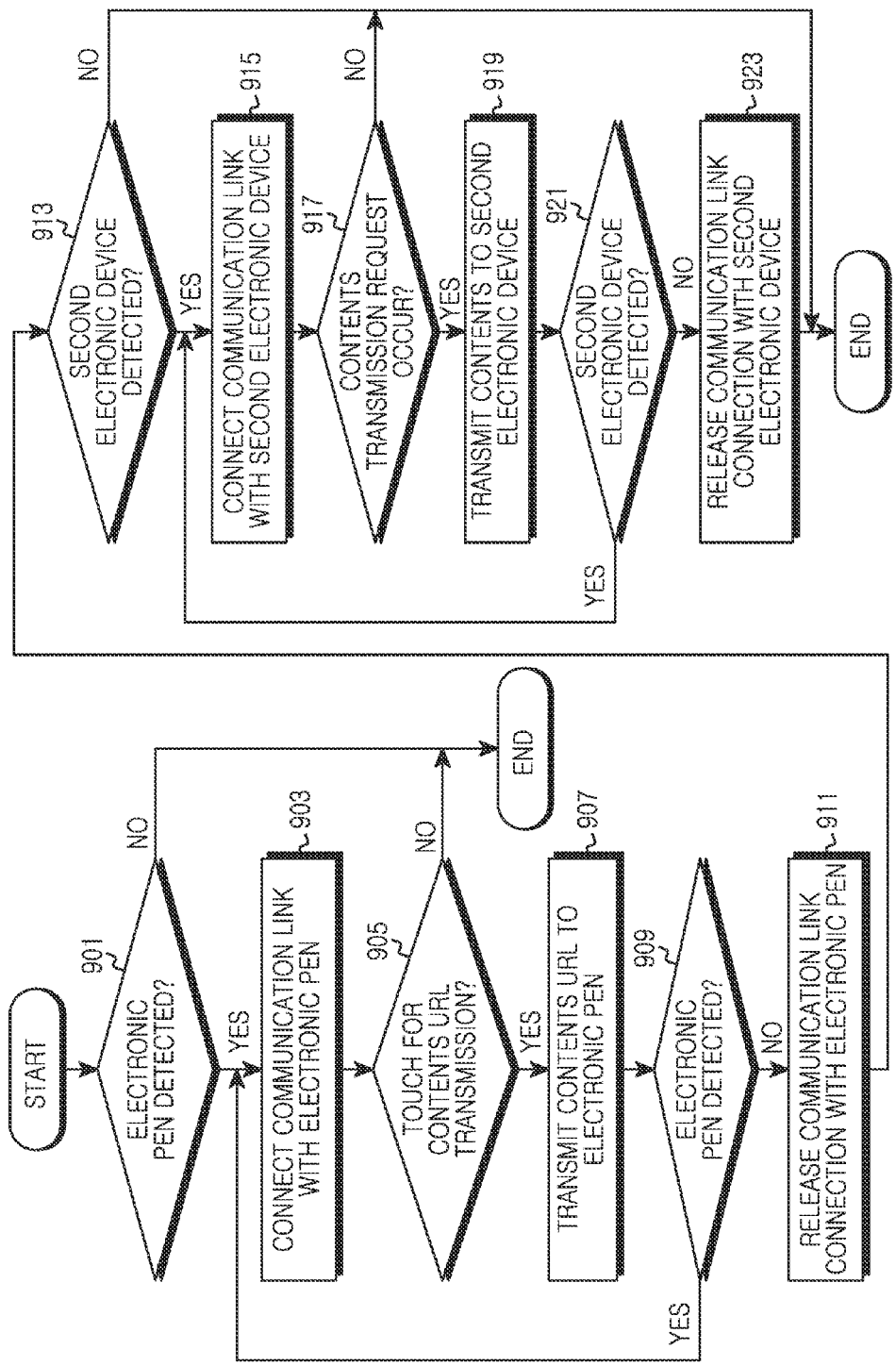
FIG. 9 is a flowchart illustrating a procedure for transmitting content from a first electronic device to a second electronic device using an electronic pen according to an exemplary embodiment of the present invention.

FIG. 9 is a flowchart illustrating a procedure for transmitting content from a first electronic device to a second electronic device using an electronic pen according to an exemplary embodiment of the present invention.

Referring to FIG. 9, the first electronic device determines whether an electronic pen is detected in step 901. For example, if the electronic pen supports NFC, the first electronic device determines whether an NFC signal of the electronic pen is detected within an NFC range. As another example, if the electronic pen supports the wireless LAN direct, the first electronic device may determine whether a wireless LAN direct signal of the electronic pen is detected within a wireless LAN direct range. If the electronic pen is not detected, the first electronic device ends the present algorithm.

In contrast, if the electronic pen is detected in step 901, the first electronic device proceeds to step 903 in which the first electronic device connects a communication link with the electronic pen.

Thereafter, the first electronic device proceeds to step 905 in which the first electronic device determines whether a touch for transmission of a content URL occurs. For example, as illustrated in FIG. 16A, the first electronic device 1601 determines whether a menu for requesting transmission of the content in step 1607 URL is selected via the touchscreen. As another example, the first electronic device 1601 determines whether a gesture for requesting transmission of the content in step 1607 URL is detected. If the touch for transmission of the content URL does not occur, the first electronic device ends the present algorithm.

In contrast, if the touch for transmission of the content URL occurs in step 905, the first electronic device proceeds to step 907 in which the first electronic device transmits the content URL to the electronic pen. For example, as illustrated in FIGS. 16A and 16B, if a request for URL transmission of moving picture data 1607 that is being provided by the first electronic device 1601 occurs, the first electronic device 1601 transmits a store path of the moving picture data 1607 that are being provided to the electronic pen 1603. At this point, the data of the first electronic device may be stored in a specific server.

After transmitting the content URL to the electronic pen in step 907, the first electronic device proceeds to step 909 in which the first electronic device determines whether the electronic pen is detected. If the electronic pen is detected, the first electronic device proceeds to step 903 to maintain the communication link connection with the electronic pen.

In contrast, if the electronic pen is not detected in step 909, the first electronic device proceeds to step 911 in which the first electronic device releases the communication link connection with the electronic pen.

After releasing the communication link connection with the electronic pen in step 911, the first electronic device determines whether a second electronic device is detected in step 913. For example, if the second electronic device supports NFC, the first electronic device determines whether an NFC signal of the second electronic device is detected within an NFC range. As another example, if the second electronic device supports the wireless LAN direct, the first electronic device may determine whether a wireless LAN direct signal of the second electronic device is detected within a wireless LAN direct range. If the second electronic device is not detected, the first electronic device ends the present algorithm.

In contrast, if the second electronic device is detected in step 913, the first electronic device proceeds to step 915 in which the first electronic device connects a communication link with the second electronic device.

Thereafter, the first electronic device proceeds to step 917 in which the first electronic device determines whether a content transmission request is generated from the second electronic device. If the content transmission request is not generated from the second electronic device, the first electronic device ends the present algorithm.

In contrast, if the content transmission request is generated from the second electronic device in step 917, the first electronic device proceeds to step 919 in which the second electronic device transmits content to the second electronic device.

After transmitting the content to the second electronic device in step 919, the first electronic device proceeds to step 921 in which the first electronic device determines whether the second electronic device is detected. If the second electronic device is detected, the first electronic device proceeds to step 915 in which the first electronic device maintains the communication link connection with the second electronic device.

In contrast, if the second electronic device is not detected in step 921, the first electronic device proceeds to step 923 in which the first electronic device releases the communication link connection with the second electronic device.

Thereafter, the first electronic device ends the present algorithm.

According to exemplary embodiments of the present invention, the first electronic device may transmit content to the second electronic device using the electronic pen.

According to exemplary embodiments of the present invention, the electronic pen may transmit the content URL of the first electronic device from the first electronic device to the second electronic device.

Figure 10:
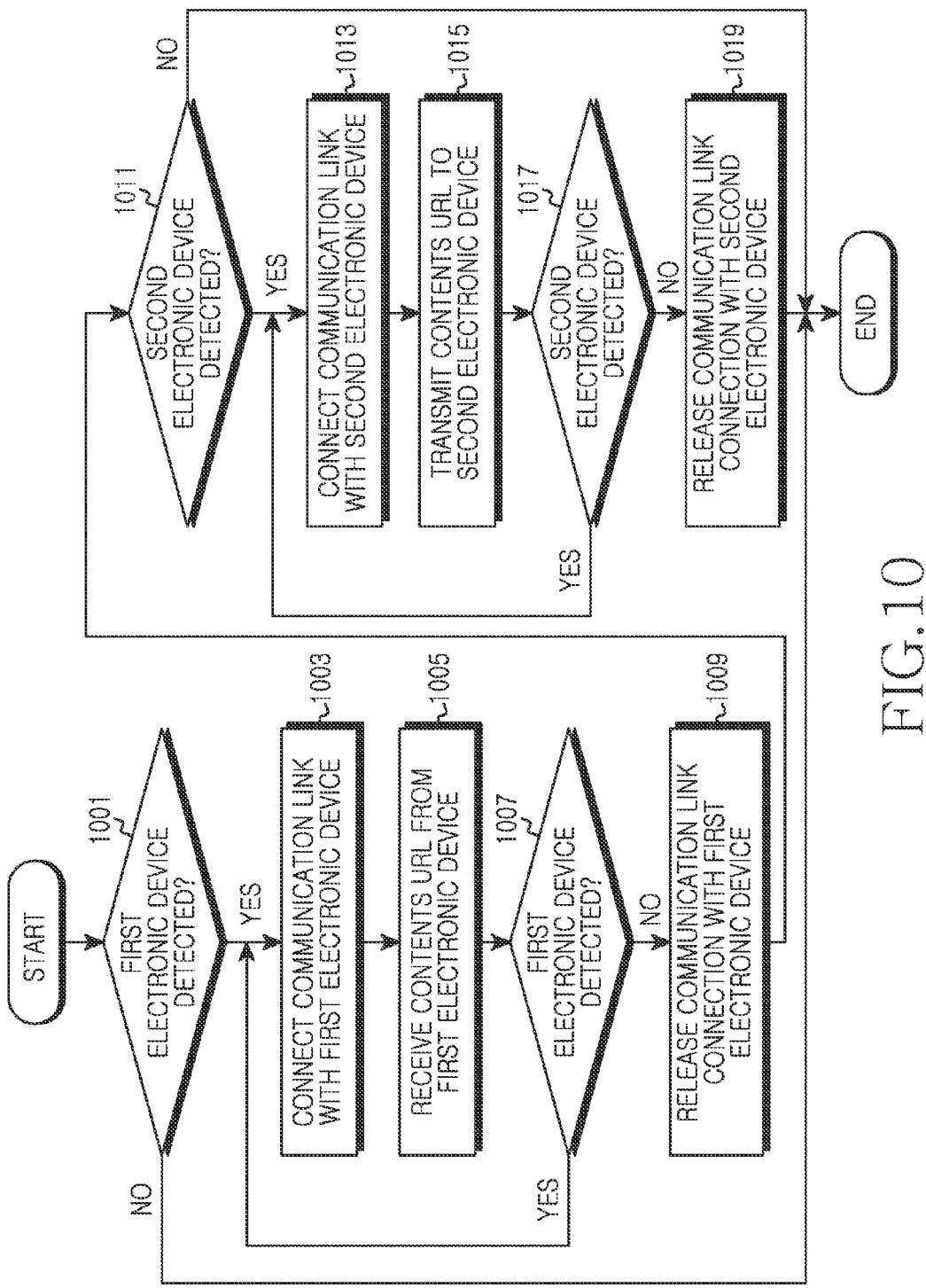
FIG. 10 is a flowchart illustrating a procedure for transmitting a content URL of a first electronic device from the first electronic device to a second electronic device using an electronic pen according to an exemplary embodiment of the present invention.

FIG. 10 is a flowchart illustrating a procedure for transmitting a content URL of a first electronic device from the first electronic device to a second electronic device using an electronic pen according to an exemplary embodiment of the present invention.

Referring to FIG. 10, the electronic pen determines whether the first electronic device is detected in step 1001. For example, if the first electronic device supports NFC, the electronic pen determines whether an NFC signal of the first electronic device is detected within an NFC range. As another example, if the first electronic device supports the wireless LAN direct, the electronic pen may determine whether a wireless LAN direct signal of the first electronic device is detected within a wireless LAN direct range. If the first electronic device is not detected, the electronic pen ends the present algorithm.

In contrast, if the first electronic device is detected in step 1001, the electronic pen proceeds to step 1003 in which the electronic pen connects a communication link with the first electronic device.

Thereafter, the electronic pen proceeds to step 1005 in which the electronic pen receives a content URL from the first electronic device. For example, as illustrated in FIGS. 16A and 16B, the electronic pen 1603 selects a menu for requesting transmission of the content 1607 URL via the touchscreen of the first electronic device 1601. As another example, the electronic pen 1603 may input a gesture for requesting transmission of the content 1607 URL.

After receiving the content URL from the first electronic device, the electronic pen proceeds to step 1007 in which the electronic pen determines whether the first electronic device is detected. If the first electronic device is detected, the electronic pen proceeds to step 1003 in which the electronic pen maintains the communication link connection with the first electronic device.

In contrast, if the first electronic device is not detected, the electronic pen proceeds to step 1009 in which the electronic pen releases the communication link connection with the first electronic device.

After releasing the communication link connection with the first electronic device, the electronic pen proceeds to step 1011 in which the electronic pen determines whether the second electronic device is detected. For example, if the second electronic device supports NFC, the electronic pen determines whether an NFC signal of the second electronic device is detected within an NFC range. As another example, if the second electronic device supports the wireless LAN direct, the electronic pen may determine whether a wireless LAN direct signal of the second electronic device is detected within a wireless LAN direct range. If the second electronic device is not detected, the electronic pen ends the present algorithm.

In contrast, if the second electronic device is detected in step 1011, the electronic pen proceeds to step 1013 in which the electronic pen connects a communication link with the second electronic device.

Thereafter, the electronic pen proceeds to step 1015 in which the electronic pen transmits a content URL to the second electronic device. For example, as illustrated in FIGS. 16B and 16C, the electronic pen 1603 selects a menu for requesting transmission of the content 1609 URL via the touchscreen of the second electronic device 1605. As another example, the electronic pen 1603 may input a gesture for requesting transmission of the content 1609 URL.

After transmitting the content URL to the second electronic device in step 1015, the electronic pen proceeds to step 1017 in which the electronic pen determines whether the second electronic device is detected. If the second electronic device is detected, the electronic pen proceeds to step 1013 to maintain the communication link connection with the second electronic device.

In contrast, if the second electronic device is not detected in step 1015, the electronic pen proceeds to step 1019 in which the electronic pen releases the communication link connection with the second electronic device.

Thereafter, the electronic pen ends the present algorithm.

According to exemplary embodiments of the present invention, the electronic pen may transmit the content URL of the first electronic device from the first electronic device to the second electronic device.

According to exemplary embodiments of the present invention, the second electronic device may receive a content URL of the first electronic device from the electronic pen, and may receive content from the first electronic device using the received content URL of the first electronic device.

Figure 11:
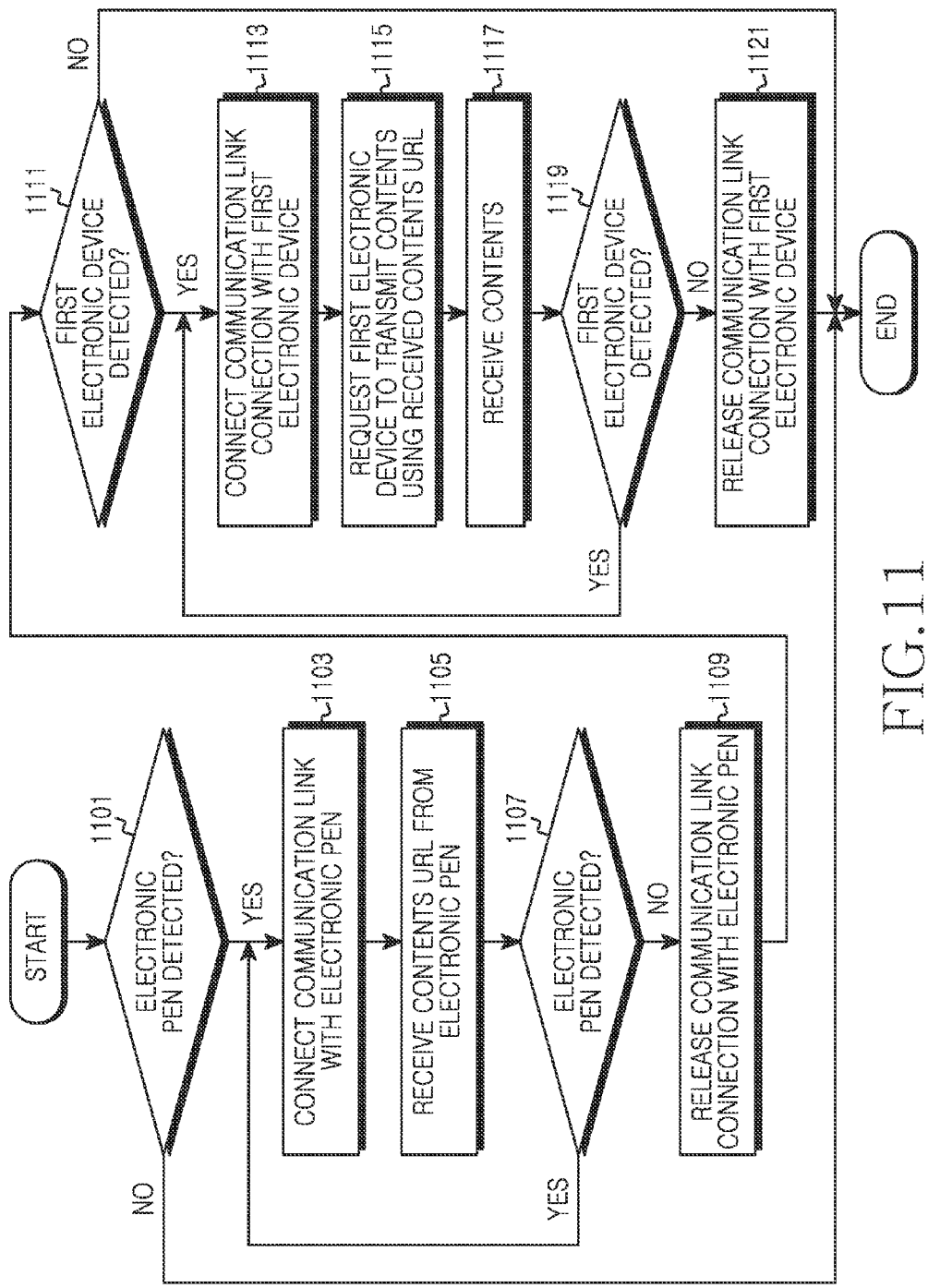
FIG. 11 is a flowchart illustrating a procedure for receiving, at a second electronic device, content from a first electronic device using a content URL of the first electronic device received from an electronic pen according to an exemplary embodiment of the present invention.

FIG. 11 is a flowchart illustrating a procedure for receiving, at a second electronic device, content from a first electronic device using a content URL of the first electronic device received from an electronic pen according to an exemplary embodiment of the present invention.

Referring to FIG. 11, the second electronic device determines whether the electronic pen is detected in step 1101. For example, if the electronic pen supports NFC, the second electronic device determines whether an NFC signal of the electronic pen is detected within an NFC range. As another example, if the electronic pen supports the wireless LAN direct, the second electronic device may determine whether a wireless LAN direct signal of the electronic pen is detected within a wireless LAN direct range. If the electronic pen is not detected, the second electronic device ends the present algorithm.

In contrast, if the electronic pen is detected in step 1101, the second electronic device proceeds to step 1103 in which the second electronic device connects a communication link with the electronic pen.

Thereafter, the second electronic device proceeds to step 1105 in which the second electronic device receives a content URL from the electronic pen. For example, as illustrated in FIG. 16C, the second electronic device 1605 determines whether a menu for requesting transmission of the content 1609 URL is selected via the touchscreen. As another example, the second electronic device 1605 may determine whether a gesture for requesting transmission of the content 1609 URL is detected.

After receiving the content URL from the electronic pen, the second electronic device proceeds to step 1107 in which the second electronic device determines whether the electronic pen is detected. If the electronic pen is detected, the second electronic device proceeds to step 1103 to maintain the communication link connection with the electronic pen.

In contrast, if the electronic pen is not detected in step 1107, the second electronic device proceeds to step 1109 in which the second electronic device releases the communication link connection with the electronic pen.

After releasing the communication link connection with the electronic device in step 1109, the second electronic device proceeds to step 1111 in which the second electronic device determines whether the first electronic device is detected. For example, if the first electronic device supports NFC, the second electronic device determines whether an NFC signal of the first electronic device is detected within an NFC range. As another example, if the first electronic device supports the wireless LAN direct, the second electronic device may determine whether a wireless LAN direct signal of the first electronic device is detected within a wireless LAN direct range. If the first electronic device is not detected, the second electronic device ends the present algorithm.

In contrast, if the first electronic device is detected in step 1111, the second electronic device proceeds to step 1113 in which the first electronic device connects a communication link with the first electronic device.

After connecting the communication link with the first electronic device, the second electronic device proceeds to step 1115 in which the second electronic device requests the first electronic device to transmit content using the content URL of the first electronic device received from the electronic pen.

After requesting the first electronic device to transmit the content, the second electronic device proceeds to step 1117 in which the second electronic device receives the content from the first electronic device.

After that, the second electronic device proceeds to step 1119 in which the second electronic device determines whether the first electronic device is detected. If the first electronic device is detected, the second electronic device proceeds to step 1113 in which the second electronic device maintains the communication link connection with the first electronic device.

If the first electronic device is not detected in step 1119, the second electronic device proceeds to step 1121 in which the second electronic device releases the communication link connection with the first electronic device.

Thereafter, the second electronic device ends the present algorithm.

According to exemplary embodiments of the present invention, the content URL of the first electronic device may be transmitted to the second electronic device via the electronic pen, and the second electronic device may receive the content from the first electronic device.

According to exemplary embodiments of the present invention, the content of the first electronic device may be transmitted to the second electronic device via the electronic pen.

Figure 12:
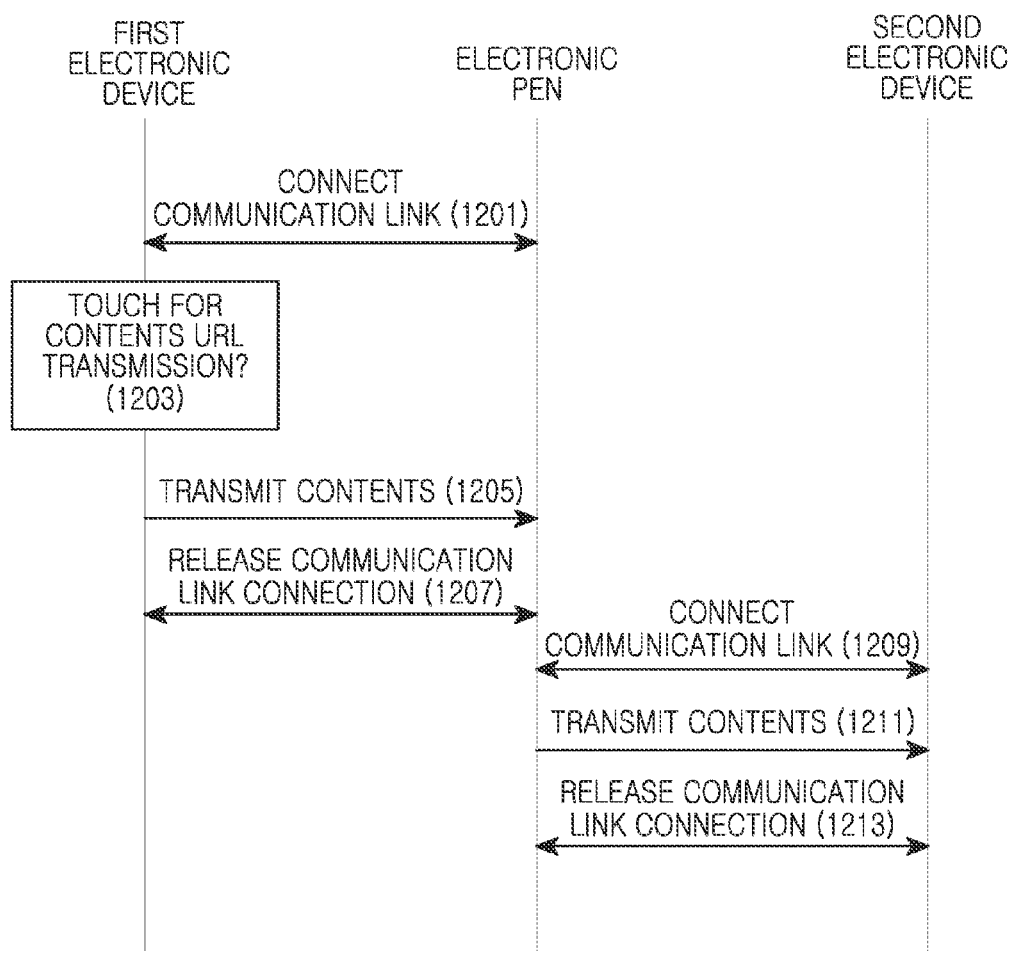
FIG. 12 is a diagram illustrating a procedure for transmitting content in an electronic device according to an exemplary embodiment of the present invention.

FIG. 12 is a diagram illustrating a procedure for transmitting content in an electronic device according to an exemplary embodiment of the present invention.

Referring to FIG. 12, a first electronic device connect a communication link with an electronic pen in step 1201. For example, if the first electronic device and the electronic pen support NFC, the first electronic device detects an NFC signal of the electronic pen within an NFC range to connect the communication link.

The first electronic device determines whether a touch for content transmission occurs in step 1203. For example, as illustrated in FIG. 16A, the first electronic device 1601 determines whether a menu for requesting transmission of the content 1607 is selected via the touchscreen. As another example, the first electronic device 1601 determines whether a gesture for requesting transmission of the content 1607 is detected.

The first electronic device 1601 transmits the content to the electronic pen in step 1205. For example, as illustrated in FIGS. 16A and 16B, if a transmission request for moving picture data 1607 that is being provided by the first electronic device 1601 occurs, the first electronic device 1601 transmits the moving picture data 1607 that is being provided to the electronic pen 1603.

The first electronic device 1601 releases a communication link connection with the electronic pen in step 1207. For example, if the first electronic device 1601 and the electronic pen are connected via NFC, the first electronic device 1601 releases the communication link connection between the first electronic device 1601 and the electronic pen if an NFC signal of the electronic pen is not detected within the NFC range.

The electronic pen connect a communication link with the second electronic device in step 1209. For example, if the electronic pen and the second electronic device support NFC, the electronic pen detects an NFC signal of the second electronic device within an NFC range to connect the communication link.

The electronic pen transmits content to the second electronic device in step 1211. For example, as illustrated in FIGS. 16A and 16B, the electronic pen 1603 selects a menu for requesting transmission of the content 1609 via the touchscreen of the second electronic device 1605. As another example, the electronic pen 1603 may input a gesture for requesting transmission of the content 1609.

The electronic pen releases the communication link connection with the second electronic device in step 1213. For example, the electronic pen and the second electronic device are connected via NFC, the electronic pen releases the communication link connection between the electronic pen and the second electronic device if an NFC signal of the second electronic device is not detected within an NFC range.

Figure 13:
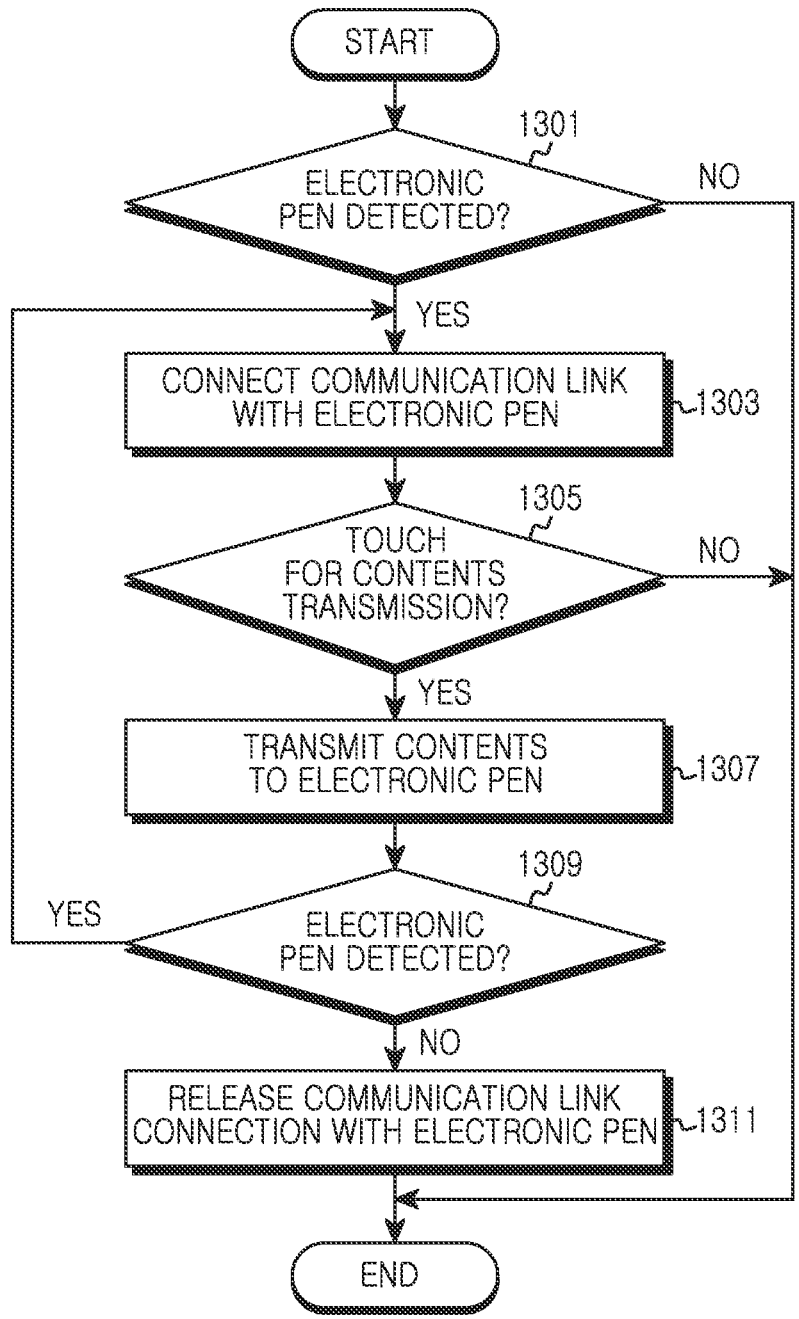
FIG. 13 is a flowchart illustrating a procedure for transmitting, at a first electronic device, content using an electronic pen according to an exemplary embodiment of the present invention.

FIG. 13 is a flowchart illustrating a procedure for transmitting, at a first electronic device, content using an electronic pen according to an exemplary embodiment of the present invention.

Referring to FIG. 13, the first electronic device determines whether the electronic pen is detected in step 1301. For example, if the electronic pen supports NFC, the first electronic device determines whether an NFC signal of the electronic pen is detected within an NFC range. As another example, if the electronic pen supports the wireless LAN direct, the first electronic device may determine whether a wireless LAN direct signal of the electronic pen is detected within a wireless LAN direct range. If the electronic pen is not detected, the first electronic device ends the present algorithm.

In contrast, if the electronic pen is detected in step 1301, the first electronic device proceeds to step 1303 in which the first electronic device connects a communication link with the electronic pen.

Thereafter, the first electronic device proceeds to step 1305 in which the first electronic device determines whether a touch for transmission of content occurs. For example, as illustrated in FIG. 16A, the first electronic device 1601 determines whether a menu for requesting transmission of the content 1607 is selected via the touchscreen. As another example, the first electronic device 1601 may determine whether a gesture for requesting transmission of the content 1607 is detected. If a touch for content transmission does not occur, the first electronic device ends the present algorithm.

If the touch for content transmission occurs, the first electronic device proceeds to step 1307 in which the first electronic device transmits the content to the electronic pen. For example, as illustrated in FIGS. 16A and 16B, if a transmission request for the moving picture data 1607 that is being provided by the first electronic device 1601 occurs, the first electronic device 1601 transmits the moving picture data 1607 that is being provided to the electronic pen 1603.

After transmitting the content to the electronic pen in step 1307, the first electronic device proceeds to step 1309 in which the first electronic device determines whether the electronic pen is detected. If the electronic pen is detected, the first electronic device proceeds to step 1303 in which the first electronic device maintains the communication link connection with the electronic pen.

In contrast, if the electronic pen is not detected in step 1309, the first electronic device proceeds to step 1311 in which the first electronic device releases the communication link connection with the electronic pen.

Thereafter, the first electronic device ends the present algorithm.

According to exemplary embodiments of the present invention, the first electronic device may transmit the content to the electronic pen.

According to exemplary embodiments of the present invention, the electronic pen may transmit the content of the first electronic device from the first electronic device to a second electronic device.

Figure 14:
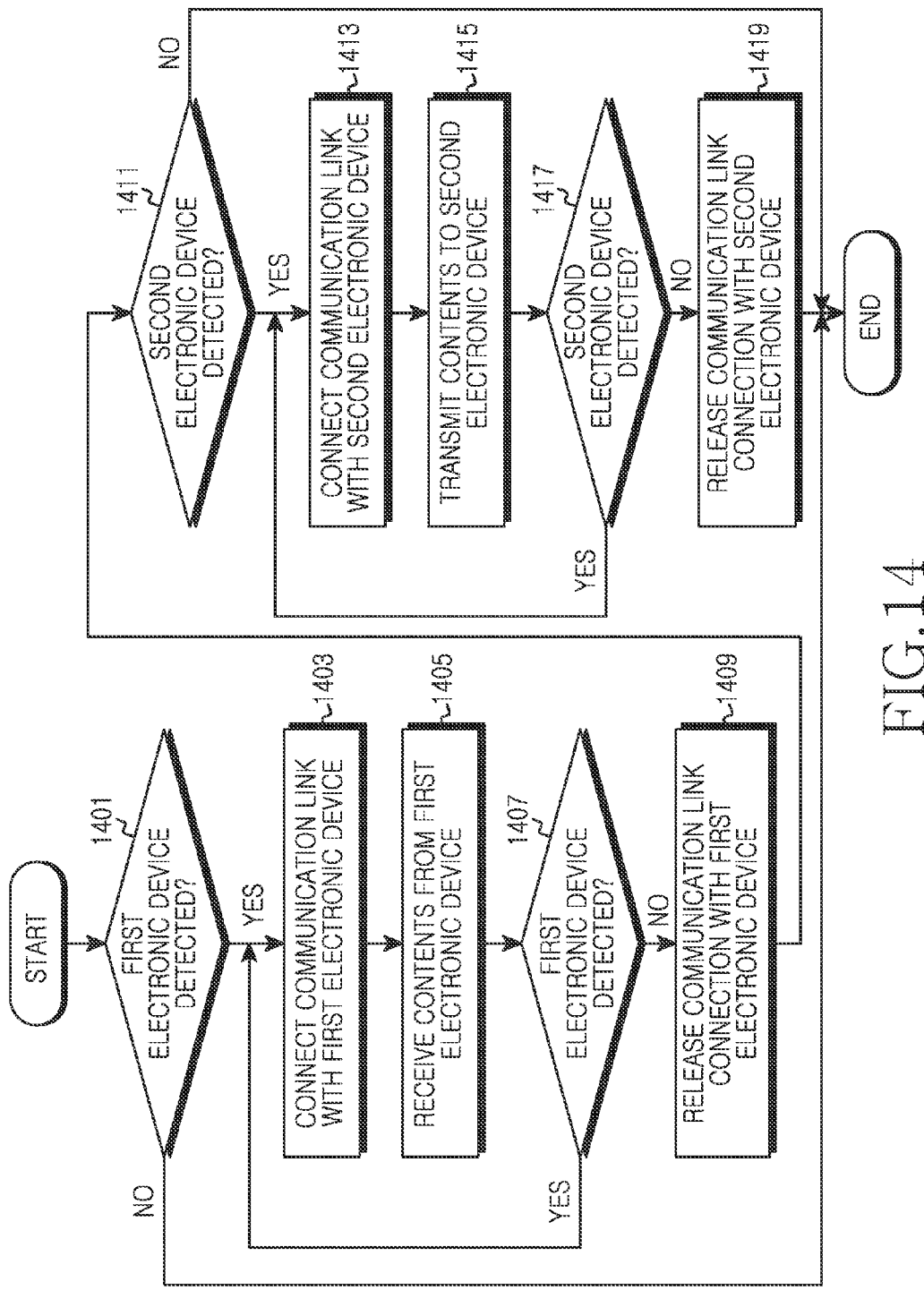
FIG. 14 is a flowchart illustrating a procedure for transmitting content of a first electronic device from the first electronic device to a second electronic device using an electronic pen according to an exemplary embodiment of the present invention.

FIG. 14 is a flow chart illustrating a procedure for transmitting content of a first electronic device from the first electronic device to a second electronic device using an electronic pen according to an exemplary embodiment of the present invention.

Referring to FIG. 14, the electronic pen determines whether the first electronic device is detected in step 1401. For example, if the first electronic device supports NFC, the electronic pen determines whether an NFC of the first electronic device is detected within an NFC range. As another example, if the first electronic device supports the wireless LAN direct, the electronic pen may determine whether a wireless LAN direct signal of the first electronic device is detected within a wireless LAN direct range. If the first electronic device is not detected, the electronic pen ends the present algorithm.

In contrast, if the first electronic device is detected in step 1401, the electronic pen proceeds to step 1403 in which the electronic pen connects a communication link with the first electronic device.

Thereafter, the electronic pen proceeds to step 1405 in which the electronic pen receives content from the first electronic device. For example, as illustrated in FIGS. 16A and 16B, the electronic pen 1603 selects a menu for requesting transmission of the content 1607 via the touchscreen of the first electronic device 1601. As another example, the electronic pen 1603 may input a gesture for requesting transmission of the content 1607.

After receiving the content from the first electronic device in step 1405, the electronic pen proceeds to step 1407 in which the electronic pen determines whether the first electronic device is detected. If the first electronic device is detected, the electronic pen proceeds to step 1403 in which the electronic pen maintains the communication link connection with the first electronic device.

In contrast, if the first electronic device is not detected, the electronic pen proceeds to step 1409 in which the electronic pen releases the communication link connection with the first electronic device.

After releasing the communication link connection with the first electronic device, the electronic pen proceeds to step 1411 in which the electronic pen determines whether the second electronic device is detected. For example, if the second electronic device supports NFC, the electronic pen determines whether an NFC signal of the second electronic device is detected within an NFC range. As another example, if the second electronic device supports the wireless LAN direct, the electronic pen may determine whether a wireless LAN direct signal of the second electronic device is detected within a wireless LAN direct range. If the second electronic device is not detected, the electronic pen ends the present algorithm.

In contrast, if the second electronic device is detected in step 1411, the electronic pen proceeds to step 1413 in which the electronic pen connects a communication link with the second electronic device.

Thereafter, the electronic pen proceeds to step 1415 to transmit the content to the second electronic device. For example, as illustrated in FIGS. 16B and 16C, the electronic pen 1603 selects a menu for requesting transmission of the content 1609 via the touchscreen of the second electronic device 1605. As another example, the second electronic device 1605 may input a gesture for requesting transmission of the content 1609.

After transmitting the content to the second electronic device in step 1415, the electronic pen proceeds to step 1417 in which the electronic pen determines whether the second electronic device is detected. If the second electronic device is detected, the electronic pen proceeds to step 1413 in which the electronic pen maintains the communication link connection with the second electronic device.

In contrast, when the second electronic device is not detected in step 1417, the electronic pen proceeds to step 1419 in which the electronic pen releases the communication link connection with the second electronic device.

Thereafter, the electronic pen ends the present algorithm.

According to exemplary embodiments of the present invention, the electronic pen may transmit the content of the first electronic device from the first electronic device to the second electronic device.

According to exemplary embodiments of the present invention, the second electronic device may receive the content of the first electronic device from the electronic pen.

Figure 15:
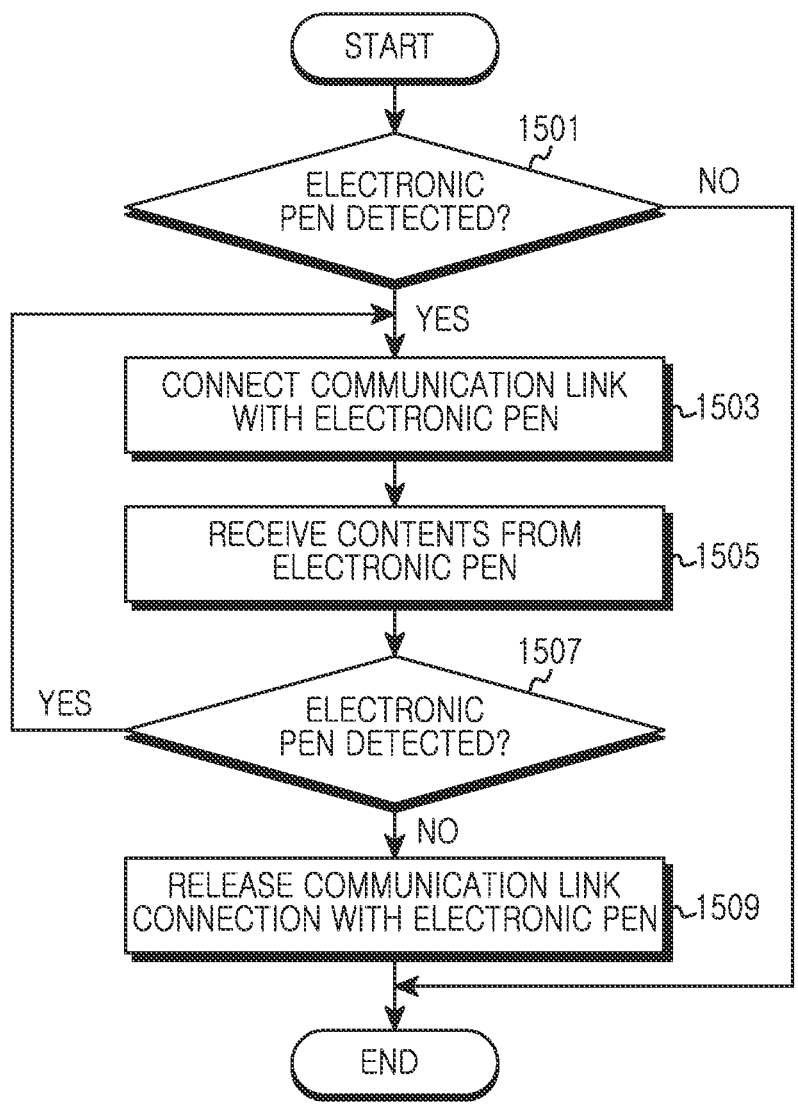
FIG. 15 is a flowchart illustrating a procedure for receiving, at a second electronic device, content of a first electronic device from an electronic pen according to an exemplary embodiment of the present invention.

FIG. 15 is a flowchart illustrating a procedure for receiving, at a second electronic device, content of a first electronic device from an electronic pen according to an exemplary embodiment of the present invention.

Referring to FIG. 15, the second electronic device determines whether the electronic pen is detected in step 1501. For example, if the electronic pen supports NFC, the second electronic device determines whether an NFC signal of the electronic pen is detected within an NFC range. As another example, if the electronic pen supports the wireless LAN direct, the second electronic device may determine whether a wireless LAN direct signal of the electronic pen is detected within a wireless LAN direct range. If the electronic pen is not detected, the second electronic device ends the present algorithm.

In contrast, if the electronic pen is detected in step 1501, the second electronic device proceeds to step 1503 in which the electronic device connects a communication link with the electronic pen.

Thereafter, the second electronic device proceeds to step 1505 in which the second electronic device receives content of a first electronic device. For example, as illustrated in FIG. 16C, the second electronic device 1605 determines whether a menu for requesting transmission of the content 1609 is selected via the touchscreen. As another example, the second electronic device 1605 determines whether a gesture for requesting transmission of the content 1609 is detected.

After receiving the content from the electronic pen in step 1505, the second electronic device proceeds to step 1507 in which the second electronic device determines whether the electronic pen is detected. If the electronic pen is detected, the second electronic device proceeds to step 1503 in which the second electronic device maintains the communication link connection with the electronic pen.

In contrast, if the electronic pen is not detected in step 1507, the second electronic device proceeds to step 1509 in which the second electronic device releases the communication link connection with the electronic pen.

Thereafter, the second electronic device ends the present algorithm.

According to exemplary embodiments of the present invention, a communication scheme between the first electronic device and the electronic pen and a communication scheme between the electronic pen and the second electronic device may be different from each other.

As described above, an exemplary embodiment of the present invention can transmit content between electronic devices using the electronic pen, so that users of the electronic device can conveniently share the content between the electronic devices.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting content information in an electronic device, the method comprising:
    connecting a communication link with a first electronic device;
    transmitting, in response to a selection of a menu requesting transmission of information regarding content, the information regarding the content to the first electronic device for sharing the information regarding the content with a second electronic device; and
    releasing the communication link with the first electronic device,
    wherein the information regarding the content comprises uniform resource locator (URL) information to access a third electronic device at which the content is stored, and
    wherein the selection of the menu is performed by the first electronic device on a screen of the electronic device.

2. The method of claim 1, wherein the transmitting of the information regarding the content in to the first electronic device comprises:
    selecting the content to be transmitted to the second electronic device according to touch information of the first electronic device; and
    generating the information regarding the content including the URL information for the selected content.

3. The method of claim 1, wherein the first electronic device comprises an electronic pen.

4. A method for transmitting content information in an electronic device, the method comprising:
    connecting a first communication link with a first electronic device;
    receiving, in response to a selection of a menu requesting transmission of information regarding content, the information regarding the content from the first electronic device;
    connecting a second communication link with a second electronic device; and
    transmitting the information regarding the content to the second electronic device for sharing the content with the second electronic device,
    wherein the information regarding the content comprises uniform resource locator (URL) information to access a third electronic device at which the content is stored, and
    wherein the selection of the menu is performed by the electronic device on a screen of the first electronic device.

5. A method for receiving content information in an electronic device, the method comprising:
    connecting a communication link with a first electronic device;
    receiving, in response to a selection of a menu requesting transmission of information regarding content, the information regarding the content from the first electronic device;
    requesting a third electronic device to transmit the content using the information regarding the content; and
    receiving the content from the third electronic device,
    wherein the information regarding the content comprises a uniform resource locator (URL) to access the third electronic device at which the content is stored, and
    wherein the selection of the menu is performed by the first electronic device on a screen of the electronic device.

6. The method of claim 5, wherein the first electronic device comprises an electronic pen.

7. An electronic device, the electronic device comprising:
    at least one processor;
    a screen;
    a memory; and
    at least one program stored in the memory and configured for being executable by the at least one processor,
    wherein the at least one program comprises at least one instruction for:
        connecting a communication link with a first electronic device, and
        transmitting, in response to a selection of a menu requesting transmission of information regarding content, the information regarding the content to the first electronic device for sharing the information regarding the content with a second electronic device, wherein the information regarding the content comprises uniform resource locator (URL) information to access a third electronic device at which the content is stored, and wherein the selection of the menu is performed by the first electronic device on the screen.

8. The electronic device of claim 7, wherein the at least one instruction for transmitting the information regarding the content to the first electronic device comprises at least one instruction for:

selecting the content to be transmitted to the second electronic device according to touch information of the first electronic device, and generating the information regarding the content including the URL information for the selected content.

9. The electronic device of claim 7, wherein the first electronic device comprises an electronic pen.

10. An electronic device, the electronic device comprising:

at least one processor;

a memory; and at least one program stored in the memory and configured for being executable by the at least one processor, wherein the at least one program comprises at least one instruction for:

connecting a first communication link with a first electronic device, receiving, in response to a selection of a menu requesting transmission of information regarding content, the information regarding the content from the first electronic device, connecting a second communication link with a second electronic device, and transmitting the information regarding the content to the second electronic device for sharing the content with the second electronic device, wherein the information regarding the content comprises uniform resource locator (URL) information to access a third electronic device at which the content is stored, and wherein the selection of the menu is performed by the electronic device on a screen of the first electronic device.

11. An electronic device comprising:

at least one processor;

a screen;

a memory; and at least one program stored in the memory and configured for being executable by the at least one processor, wherein the at least one program comprises at least one instruction for:

connecting a first communication link with a first electronic device, receiving, in response to a selection of a menu requesting transmission of information regarding content, the information regarding the content from the first electronic device, requesting a third electronic device to transmit the content using the information regarding the content, and receiving the content from the third electronic device, wherein the information regarding the content comprises a uniform resource locator (URL) to access the third electronic device at which the content is stored, and wherein the selection of the menu is performed by the first electronic device on the screen of the electronic device.

12. The electronic device of claim 11, wherein the first electronic device comprises an electronic pen.

* * * * *